US010520776B2

United States Patent
Kabe et al.

(10) Patent No.: US 10,520,776 B2
(45) Date of Patent: Dec. 31, 2019

(54) LIQUID CRYSTAL DISPLAY DEVICE

(71) Applicant: Japan Display Inc., Minato-ku (JP)

(72) Inventors: Masaaki Kabe, Minato-ku (JP); Kojiro Ikeda, Minato-ku (JP); Shinichiro Oka, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/469,807

(22) Filed: Mar. 27, 2017

(65) Prior Publication Data
US 2017/0285415 A1 Oct. 5, 2017

(30) Foreign Application Priority Data
Mar. 30, 2016 (JP) .................................. 2016-067954

(51) Int. Cl.
*G02F 1/1343* (2006.01)
*G02F 1/1333* (2006.01)
*G02F 1/137* (2006.01)

(52) U.S. Cl.
CPC ...... *G02F 1/134309* (2013.01); *G02F 1/1333* (2013.01); *G02F 1/134363* (2013.01); *G02F 2001/13756* (2013.01); *G02F 2001/134372* (2013.01)

(58) Field of Classification Search
CPC ............ G02F 1/134309; G02F 1/1333; G02F 1/13624; G02F 2001/136245; G02F 1/134363; G02F 2001/134372; G02F 2001/134381; G09G 2300/0413
See application file for complete search history.

(56) References Cited

U.S. PATENT DOCUMENTS

| | | | | |
|---|---|---|---|---|
| 4,447,132 A | * | 5/1984 | de Zwart | C09K 19/02 349/168 |
| 2003/0201422 A1 | * | 10/2003 | Ohe | C09K 19/3003 252/299.01 |
| 2007/0030428 A1 | * | 2/2007 | Lu | G02F 1/1337 349/126 |
| 2008/0137018 A1 | * | 6/2008 | Lin | G02F 1/134363 349/141 |
| 2009/0195717 A1 | | 8/2009 | Kabe et al. | |
| 2014/0340621 A1 | * | 11/2014 | Chung | G02F 1/133514 349/106 |
| 2015/0070336 A1 | * | 3/2015 | Qu | G09G 3/3648 345/206 |
| 2017/0255048 A1 | * | 9/2017 | Ogawa | G02F 1/1368 |
| 2017/0261829 A1 | * | 9/2017 | Song | G02F 1/136227 |

FOREIGN PATENT DOCUMENTS

JP 2009-181066 8/2009

* cited by examiner

*Primary Examiner* — Paisley L Arendt
*Assistant Examiner* — Mariam Qureshi
(74) *Attorney, Agent, or Firm* — Oblon, McClelland, Maier & Neustadt, L.L.P.

(57) ABSTRACT

According to an aspect, a liquid crystal display device includes: a first substrate provided with a first electrode portion that includes a plurality of strip electrodes arranged in a first direction and that is configured to generate a transverse electric field in the first direction; a liquid crystal layer in which liquid crystal molecules are oriented in the first direction when the transverse electric field is not generated; a second substrate facing the first substrate across the liquid crystal layer; and an electrode provided at the second substrate.

10 Claims, 19 Drawing Sheets

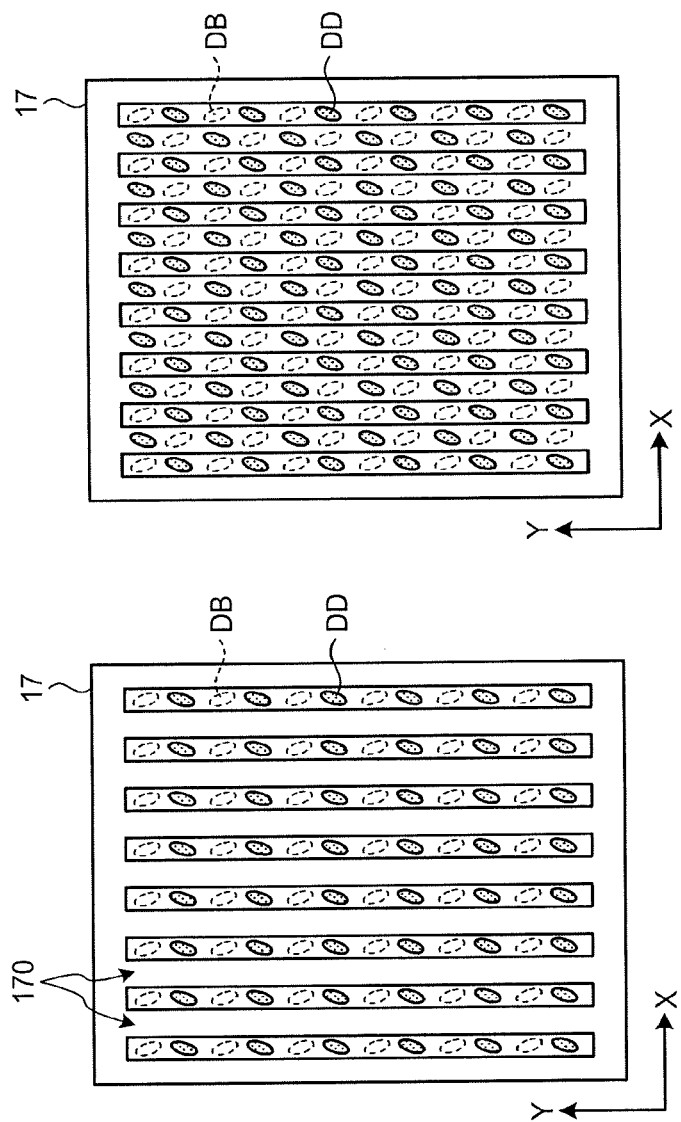

FIG.22

| CONFIGURATION | 100A | 100B | 100C | 100D | 100 |
|---|---|---|---|---|---|
| REFLECTANCE | 20.5 | 23 | 25 | 23 | 19 | of which are incorporated by reference herein in its entirety.
LIQUID CRYSTAL DISPLAY DEVICE

CROSS-REFERENCE TO RELATED APPLICATIONS

This application claims priority from Japanese Application No. 2016-067954, filed on Mar. 30, 2016, the contents of which are incorporated by reference herein in its entirety.

BACKGROUND

1. Technical Field

The present invention relates to a liquid crystal display device.

2. Description of the Related Art

As described in Japanese Patent Application Laid-open Publication No. 2009-181066, a method is known for causing a liquid crystal display device of a transverse electric field type to function as a light scattering liquid crystal display device by performing rubbing in a direction orthogonal to an extending direction of strip electrodes that apply a voltage to liquid crystals.

In the liquid crystal display device described above, scattering light tends to be reflected with lower reflectances in directions other than an initial orientation direction. This tendency causes a relatively large influence of azimuth angle dependence of the view angle of the liquid crystal display device on the angle of orientation caused by the initial orientation direction, and thus, the view angle is difficult to be increased.

For the foregoing reasons, there is a need for a liquid crystal display device that can improve the reflectance.

SUMMARY

According to an aspect, a liquid crystal display device includes: a first substrate provided with a first electrode portion that includes a plurality of strip electrodes arranged in a first direction and that is configured to generate a transverse electric field in the first direction; a liquid crystal layer in which liquid crystal molecules are oriented in the first direction when the transverse electric field is not generated; a second substrate facing the first substrate across the liquid crystal layer; and an electrode provided at the second substrate.

According to another aspect, a liquid crystal display device includes: a first substrate including a first electrode and a second electrode facing the first electrode; a second substrate facing the first substrate; a liquid crystal layer including liquid crystal molecules held between the first substrate and the second substrate; and a third electrode provided at the second substrate. The second electrode is located closer to the liquid crystal layer than the first electrode is, and has a plurality of open regions. The liquid crystal layer is configured to exhibit transparency when no voltage is applied thereto and to exhibit a scattering property when a voltage is applied thereto.

BRIEF DESCRIPTION OF THE DRAWINGS

FIG. 2A is a diagram schematically illustrating domains microscopically observed in the state where a predetermined direction and a polarizing plate form an angle of 20 degrees;

FIG. 2B is a diagram schematically illustrating domains microscopically observed in the state where the predetermined direction and the polarizing plate form an angle of 20 degrees;

FIG. 22 is a table illustrating the reflectances of the configurations illustrated in FIGS. 13, 14, 15, 16, and 10.

DETAILED DESCRIPTION

Figure 1:
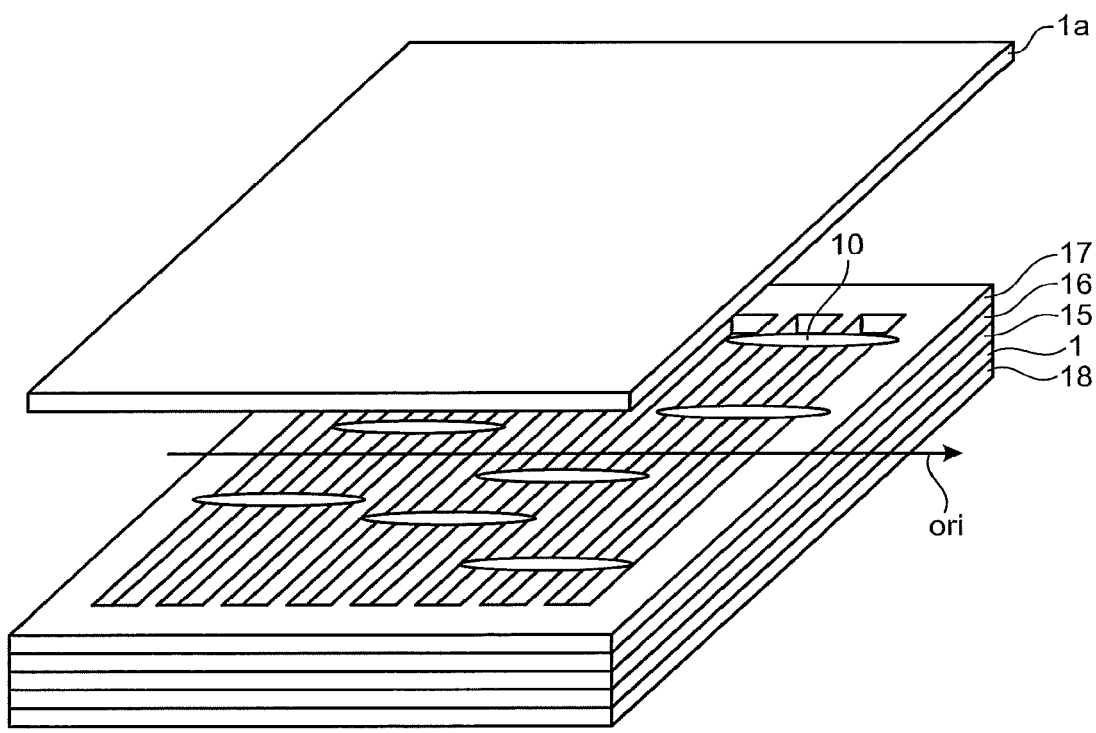
FIG. 1 is a perspective view illustrating the main configuration of a liquid crystal display device according to an embodiment of the present invention.

The following describes an embodiment for carrying out the present invention with reference to the drawings. The disclosure is merely an example, and the present invention naturally encompasses appropriate modifications easily conceivable by those skilled in the art while maintaining the gist of the invention. To further clarify the description, widths, thicknesses, shapes, and the like of various parts will be schematically illustrated in the drawings as compared with actual aspects thereof, in some cases. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First, the following describes an overview of a liquid crystal display device that is of a transverse electric field type and of a light scattering type, with reference to FIGS. 1 to 3B. FIG. 1 is a perspective view illustrating the main configuration of the liquid crystal display device according to the embodiment of the present invention. The liquid crystal display device includes a first substrate (such as a first substrate 5 illustrated in FIG. 10) in which a common electrode 15, an insulating film 16, and a pixel electrode 17 are provided on a glass substrate 1 to form a multilayered structure. The liquid crystal display device also includes a second substrate (such as a second substrate 6 or the like illustrated in FIG. 10 and other figures) that faces the first substrate across a liquid crystal layer 10. The liquid crystal layer 10 includes liquid crystal molecules having positive dielectric anisotropy.

In the configuration illustrated in FIG. 1 and other figures, a light-reflecting plate or a black plate is provided on a surface of one of the pair of the first substrate 5 and the second substrate 6, the surface not being in contact with the liquid crystal layer 10. For example, the liquid crystal display device is provided with the light-reflecting plate (mirror plate 18) on a surface on the back side (on a side opposite to a liquid crystal layer 10 side) of the first substrate 5. The light-reflecting plate may be replaced with another component, such as the black plate. The light-reflecting plate or the black plate may be provided on a surface of one of the pair of substrates, the surface facing the liquid crystal layer 10. Instead of providing the light-reflecting plate (or the black plate) at one of the substrates, the common electrode 15 may have light reflectivity or low light reflectivity. The liquid crystal display device of the present embodiment may have a configuration including neither the light-reflecting plate nor the black plate.

Each of the common electrode 15 and the pixel electrode 17 is what is called a transparent electrode made of, for example, indium tin oxide (ITO). The common electrode 15 is formed into a film on the glass substrate 1, for example, by sputtering. The insulating film 16 is made of, for example, a silicon nitride (SiNx) film.

The pixel electrode 17 serving as a first electrode portion includes a plurality of strip electrodes 170 arranged in a predetermined direction ori. Specifically, the pixel electrode 17 is patterned into a comb-tooth shape, for example, by photolithography, so as to be a configuration having a plurality of strip electrodes 170 constituting comb teeth. An open region is provided between adjacent strip electrodes 170 of the pixel electrode 17. That is, the pixel electrode 17 has a plurality of open regions. In addition, an orientation film 33 is stacked on the liquid crystal layer 10 side of the pixel electrode 17 (refer to FIG. 10). The orientation film 33 orients the liquid crystal molecules of the liquid crystal layer 10 in the predetermined direction ori in the state where a transverse electric field is not generated. Hereinafter, for the sake of convenience, an X-direction denotes a direction along the predetermined direction ori that serves as an initial orientation direction; a Y-direction denotes a direction orthogonal to the X-direction in a plane along the glass substrate 1; and a Z-direction denotes a direction orthogonal to the X- and Y-directions. That is, the strip electrodes 170 included in the pixel electrode 17 are arranged in the X-direction. Specifically, the electrodes constituting the comb teeth included in the pixel electrode 17 are strip electrodes 170 extending along the longitudinal direction thereof corresponding to the Y-direction, and the strip electrodes 170 are arranged in the X-direction so as to form the comb-tooth shape. Also, in the specification, the initial orientation direction is denoted as a first direction, the direction orthogonal to the first direction in a plane along the glass substrate 1 is denoted as a second direction, and the direction orthogonal to the first and second directions is denoted as the third direction.

Although the present embodiment is described by way of example in which the pixel electrode 17 is closer to the liquid crystal layer 10 than the common electrode 15 is, the present invention is not limited to this example. The common electrode 15 may be closer to the liquid crystal layer 10 than the pixel electrode 17 is. If the common electrode 15 is closer to the liquid crystal layer 10 than the pixel electrode 17 is, the common electrode 15 may include a plurality of strip electrodes constituting comb teeth, and may have a configuration such that open regions are provided between the strip electrodes of the common electrode 15.

The second substrate 6 faces the first substrate 5 across the liquid crystal layer 10 and has an orientation film 32 on the liquid crystal layer 10 side of a glass substrate 1a. The orientation film 32 controls the initial orientation direction of the liquid crystal molecules when no voltage is applied thereto. The initial orientation direction of the orientation film 32 only needs to be parallel to the initial orientation direction of the orientation film 33. More specifically, the initial orientation direction of the orientation film 32 is, for example, the same as that of the orientation film 33. The orientation films 32 and 33 are obtained by applying rubbing treatment to, for example, a polyimide (PI)-based orientation film material. The orientation films 32 and 33 may be photo-alignment films.

A spacer (not illustrated) corresponding to a predetermined inter-substrate gap (of, for example, 3 μm) is provided between the first substrate 5 and the second substrate 6. A space formed by the gap between the first substrate 5 and the second substrate 6 is filled with liquid crystals. That is, the liquid crystals thus filled form the liquid crystal layer 10. The liquid crystals are, for example, (positive) liquid crystals that have positive dielectric anisotropy. The orientation film 33 and the like orient the liquid crystal molecules in the predetermined direction ori, that is, in a direction orthogonal to the longitudinal direction of the strip electrodes 170 (Y-direction), when no voltage is applied to the liquid crystal molecules. Applying a voltage between the common electrode 15 and the pixel electrode 17 that are configured in this manner generates a fringe field serving as the transverse electric field in the predetermined direction ori orthogonal to the extending direction of the strip electrodes 170 (Y-direction). When the transverse electric field is generated between the pixel electrode 17 and the common electrode 15, lines of electric force are generated so as to pass through the open regions in the pixel electrode 17.

If a (negative) liquid crystal layer having negative dielectric anisotropy is provided as the liquid crystal layer 10, the predetermined direction ori is set in a direction parallel to the extending direction of the strip electrodes 170 (Y-direction).

Figure 3A:
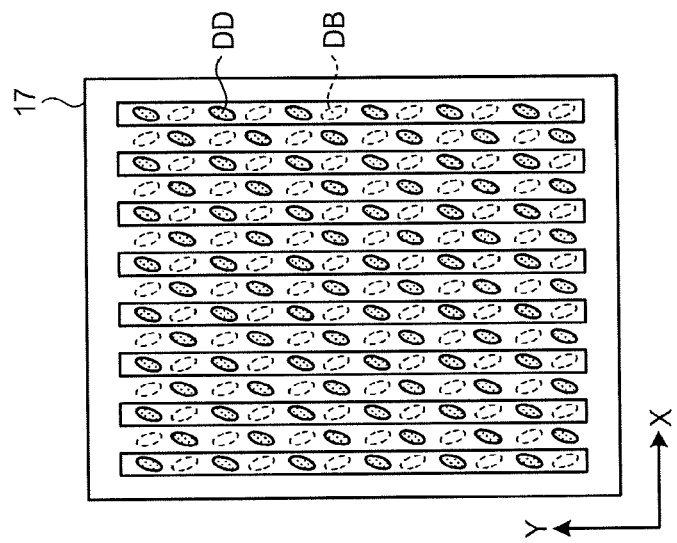
FIG. 3A is a diagram schematically illustrating the domains microscopically observed in states where the predetermined direction and the polarizing plate form an angle of 20 degrees.
Figure 3B:
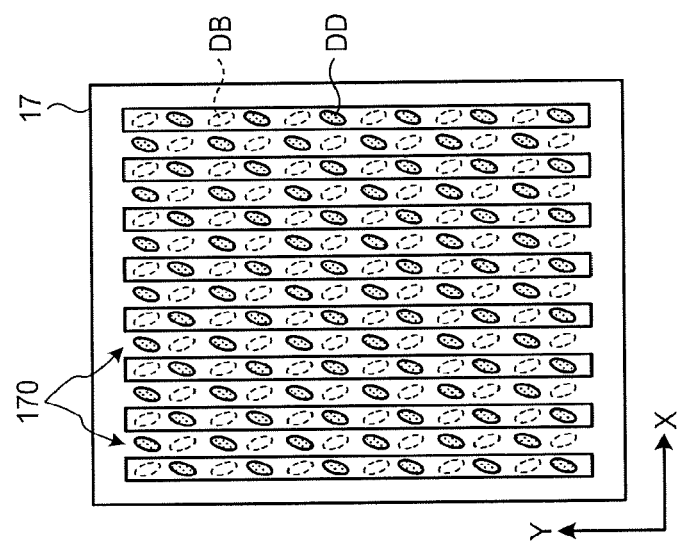
FIG. 3B is a diagram schematically illustrating the domains microscopically observed in states where the predetermined direction and the polarizing plate form an angle of −20 degrees.

The following describes states of the texture of the liquid crystals formed when a voltage is applied between the common electrode 15 and the pixel electrode 17, with reference to FIGS. 2A, 2B, 3A, and 3B. FIGS. 2A and 2B are diagrams schematically illustrating domains microscopically observed in the state where the predetermined direction and a polarizing plate form an angle of 20 degrees. FIG. 3A is a diagram schematically illustrating the domains microscopically observed in states where the predetermined direction and the polarizing plate form an angle of 20 degrees. FIG. 3B is a diagram schematically illustrating the domains microscopically observed in states where the predetermined direction and the polarizing plate form an angle of −20 degrees. In FIGS. 2A, 2B, 3A, and 3B, to facilitate the observation, the microscopic observation was performed in states where the liquid crystal display device is between polarizing plates arranged in a crossed Nicol state, and where the predetermined direction and a transmission axis of one of the polarizing plates form an angle of 20 degrees (FIGS. 2A, 2B, and 3A) and an angle of −20 degrees (FIG. 3B).

As illustrated in FIG. 2A, in the texture of the observed liquid crystals, a dark domain DD and a bright domain DB are alternately arranged in a relatively regular manner. The dark domain DD is a domain with a clear border and relatively dark insides of the border. The bright domain DB is a domain with an unclear border and relatively bright insides of the border. More specifically, no noticeable change appeared while the amplitude of the applied voltage was in the range from 0 [V] to 5 [V]. When the amplitude reached 6 [V], domains began to appear between the strip electrodes 170, as illustrated in FIG. 2A. The dark domain DD and the bright domain DB were alternately arranged along the Y-direction. When the amplitude further reached 7 [V], the same domains began to appear on the strip electrodes 170, as illustrated in FIG. 2B. Then, after the amplitude was increased to 10 [V], no noticeable change appeared in the positional relation of the dark domains DD and the bright domains DB, but scattering intensity of light increased. It has been found that the generation of such domains brings about boundaries of refractive indices between the domains, and the light is strongly scattered.

When the microscopic observation was performed in the state where the predetermined direction and the polarizing plate form an angle of −20 degrees, as illustrated in FIG. 3B, the bright domains DB appeared in the respective positions where the dark domains DD had been located when observed in the state of 20 degrees, and the dark domains DD appeared in the respective positions where the bright domains DB had been located when observed in the state of 20 degrees. In view of the results of these observations and the fact that the light passes through the polarizing plates in the crossed Nicol state, the dark domain DD and the bright domain DB are inferred to be in a twisted orientation state where the dark domain DD and bright domain DB are twisted in directions opposite to each other.

The configuration described with reference to FIGS. 1 to 3B has been found to place the liquid crystal layer in the state of strongly scattering the light when a voltage is applied thereto, and thus, scattering type liquid crystals driven by a lower voltage have been developed. In this manner, when the liquid crystal display device includes the liquid crystal layer 10 having the positive dielectric anisotropy, the liquid crystals when no voltage is applied thereto are oriented in parallel with the transverse electric field that is generated when the voltage is applied. In this configuration, the liquid crystal layer 10 exhibits a light transmission state when the transverse electric field is not applied thereto. When the transverse electric field is applied, the boundaries of refractive indices are brought about between the domains appearing between strip electrodes 170 of the comb-tooth shaped pixel electrode 17 and strongly scatter the light so that the liquid crystal layer 10 exhibits the light scattering state. That is, the liquid crystal layer 10 exhibits the transparency when no voltage is applied thereto, and exhibits the scattering property when a certain voltage or higher is applied thereto.

Figure 4:
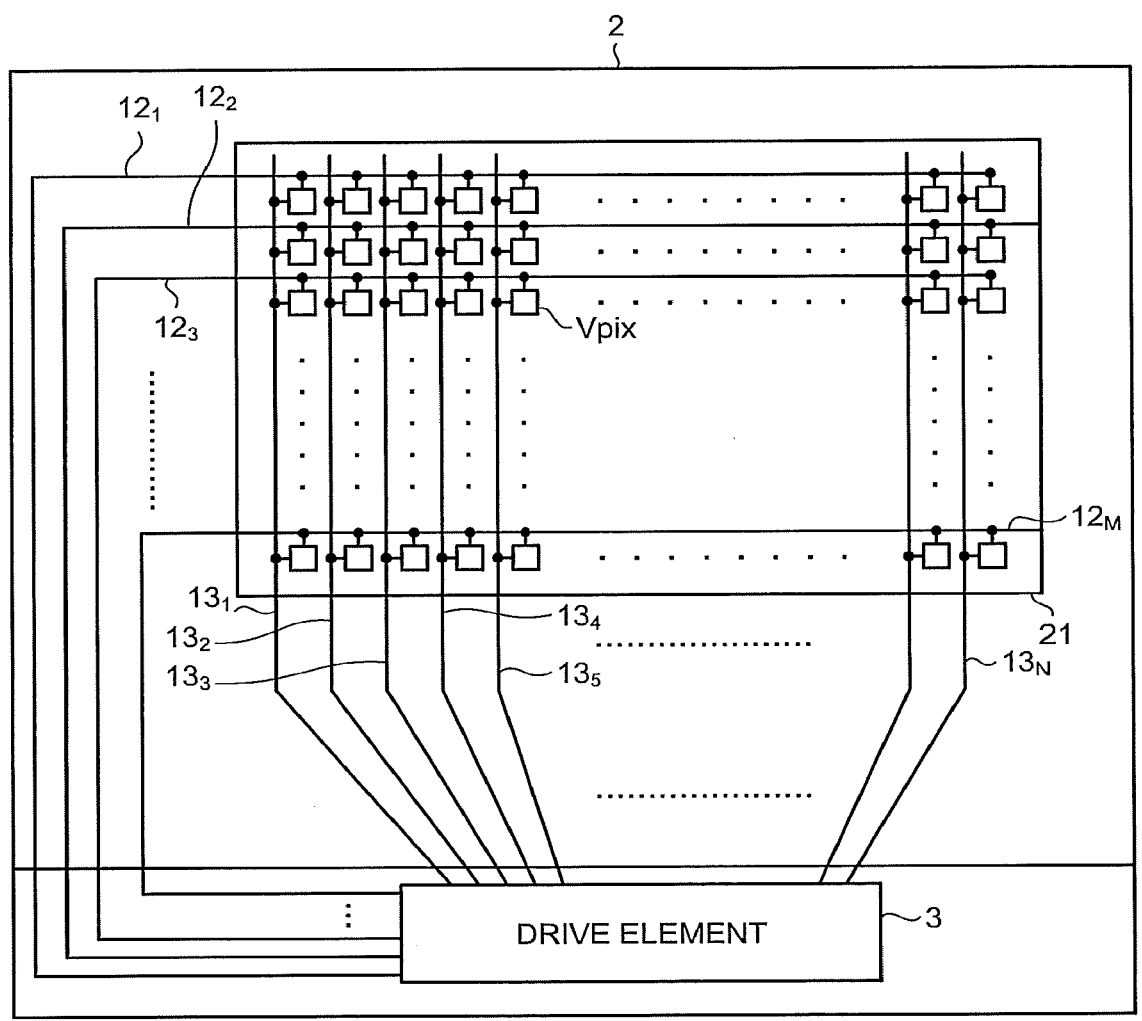
FIG. 4 is a block diagram illustrating a system configuration example of the liquid crystal display device according to the embodiment.
Figure 5:
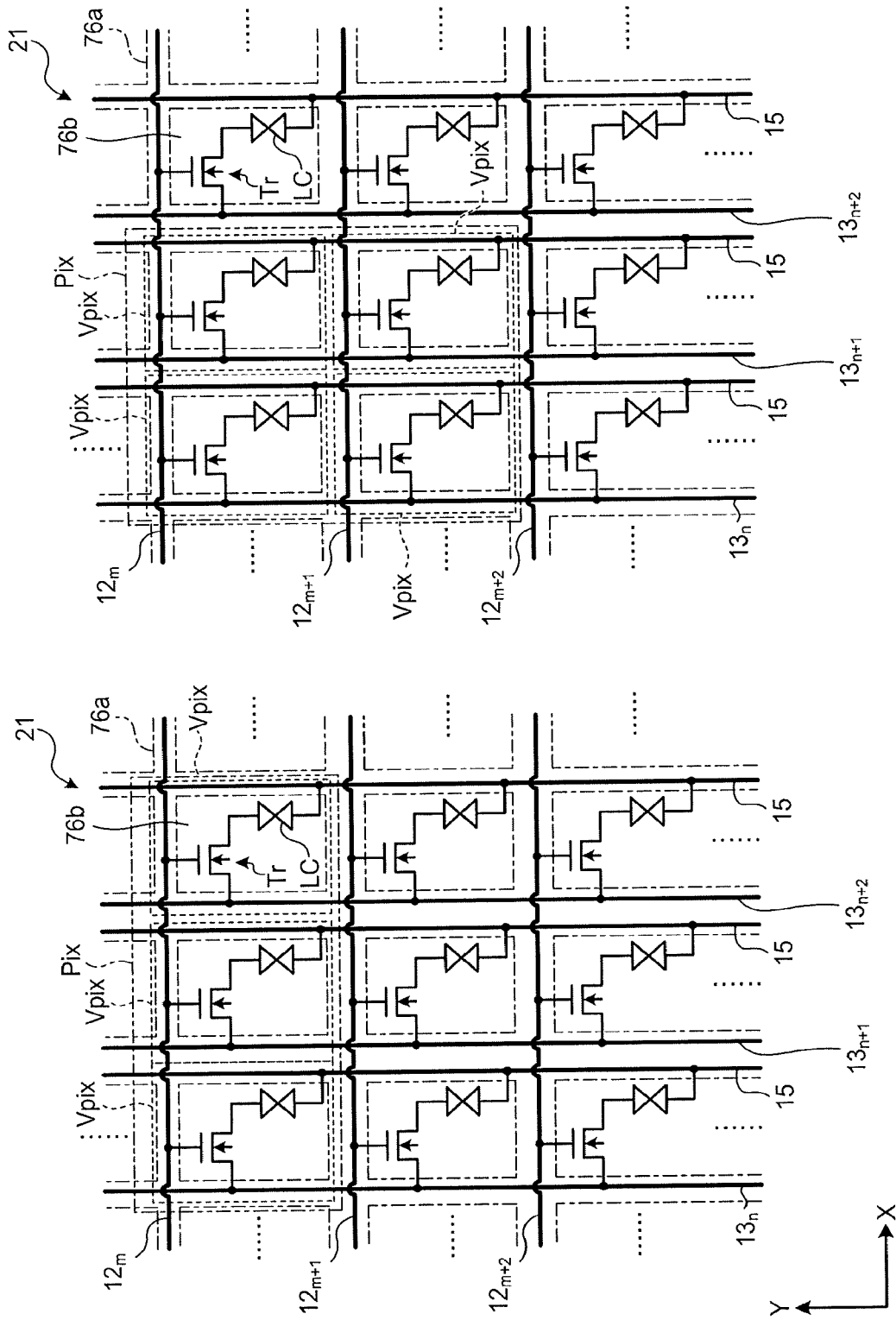
FIG. 5A is a circuit diagram illustrating an exemplary drive circuit that drives pixels of the liquid crystal display device according to the embodiment.
FIG. 5B is another circuit diagram illustrating an exemplary drive circuit that drives pixels of the liquid crystal display device according to the embodiment.
Figure 6:
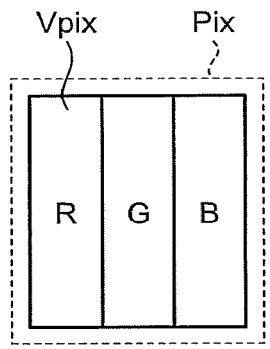
FIG. 6 is a diagram illustrating an exemplary color arrangement of a plurality of sub-pixels constituting one pixel.
Figure 7:
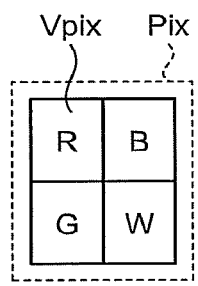
FIG. 7 is a diagram illustrating another exemplary color arrangement of a plurality of sub-pixels constituting the pixel.
Figure 8:
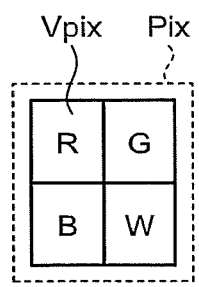
FIG. 8 is a diagram illustrating still another exemplary color arrangement of a plurality of sub-pixels constituting the pixel.
Figure 9:
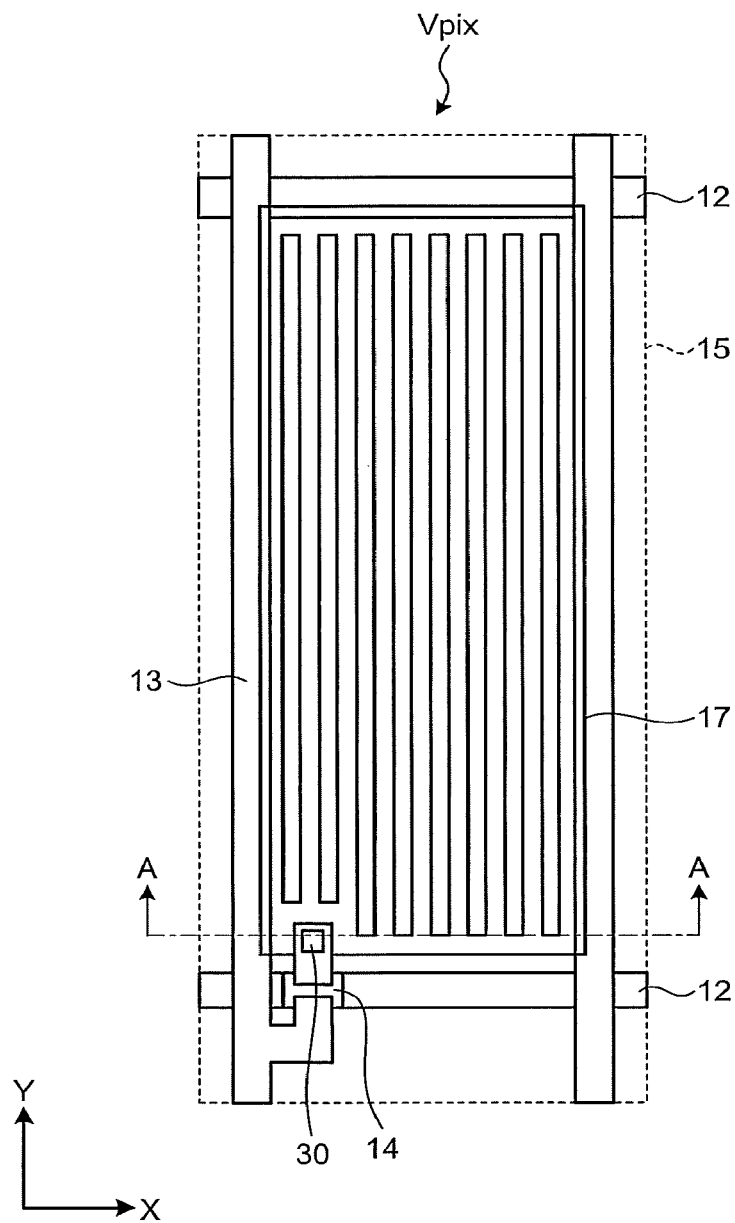
FIG. 9 is a schematic diagram illustrating a basic configuration of each of the sub-pixels included in the liquid crystal display device illustrated in FIG. 4.
Figure 10:
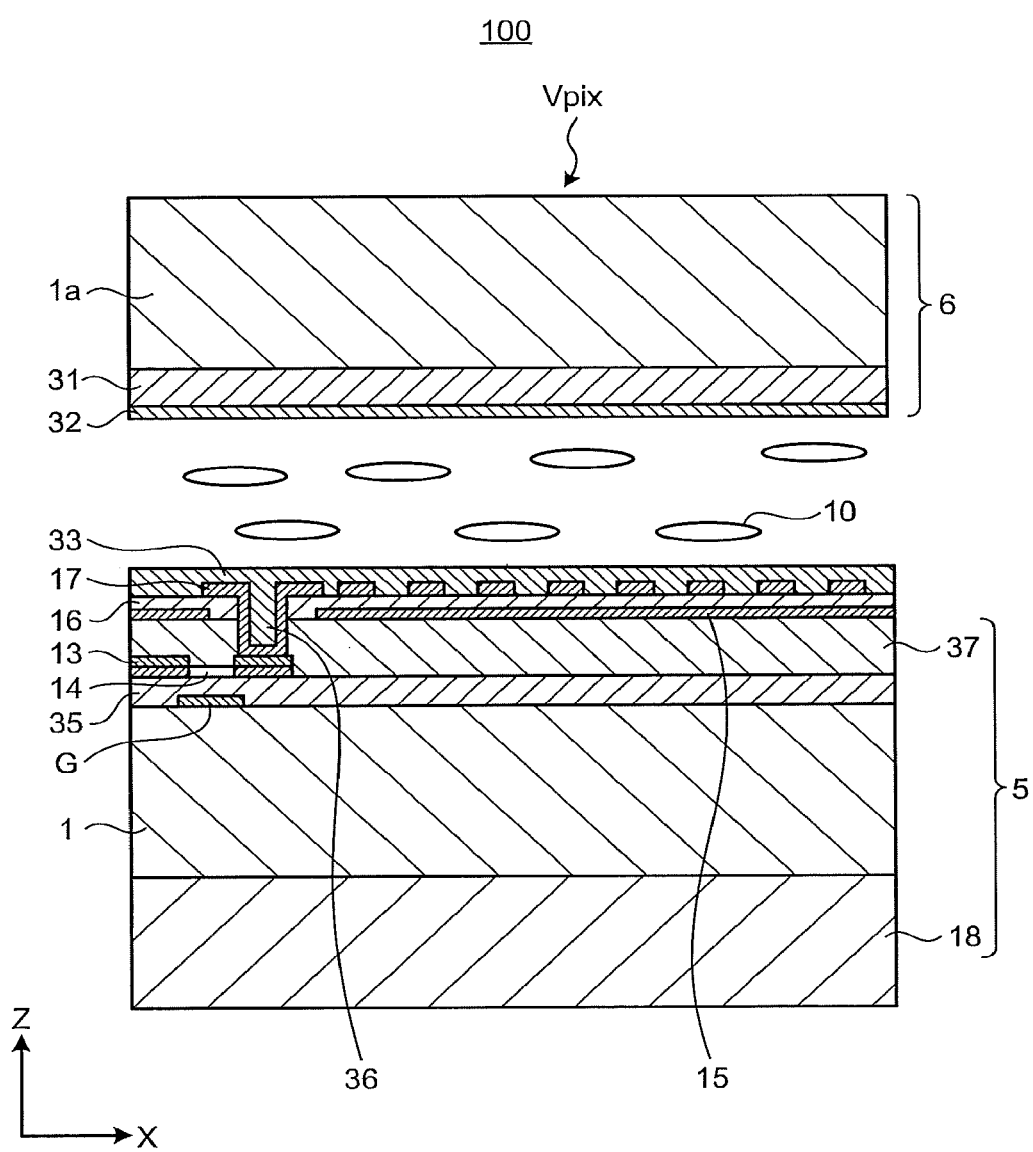
FIG. 10 is an A-A sectional view of FIG. 9.

The following describes a configuration that can be employed by the light scattering liquid crystal display device of the active matrix transverse electric field type (fringe-field switching (FFS) mode), in more detail, with reference to FIGS. 4 to 10. FIG. 4 is a block diagram illustrating a system configuration example of the liquid crystal display device according to the present embodiment. FIGS. 5A and 5B are circuit diagrams each illustrating an exemplary drive circuit that drives pixels Pix of the liquid crystal display device according to the present embodiment. Each of the pixels Pix includes a plurality of sub-pixels Vpix. Each of FIGS. 6, 7, and 8 is a diagram illustrating an exemplary color arrangement of a plurality of sub-pixels Vpix constituting the single pixel Pix. FIG. 9 is a schematic diagram illustrating a basic configuration of each of the sub-pixels Vpix included in the liquid crystal display device illustrated in FIG. 4. FIG. 10 is an A-A sectional view of FIG. 9. The liquid crystal display device includes, for example, a display panel 2 and a drive element 3, such as a display driver integrated circuit (DDIC).

The display panel 2 includes a display area 21 in which a plurality of pixels Pix (refer to FIGS. 5A and 5B) arranged in a matrix. The display panel 2 includes the first substrate (such as the first substrate 5 illustrated in FIG. 10) including the first electrode portion (such as the pixel electrode 17) and the second substrate (such as the second substrate 6 or the like illustrated in, for example, FIG. 10) that faces the first substrate across the liquid crystal layer 10, as described above. The space between the first and the second substrates includes the liquid crystal layer 10. The liquid crystal layer 10 includes the liquid crystal molecules having positive dielectric anisotropy in the gap provided by the spacer described above. The arrangements and sizes of components, such as the display area 21, illustrated in FIG. 4 are only schematic, and do not represent the actual arrangements and sizes thereof.

In the display area 21, the sub-pixels Vpix including the liquid crystal layer 10 are arranged in a matrix of M rows×N columns. The rows refer to pixel rows that are arranged in one direction and each of which has N sub-pixels Vpix. The columns refer to pixel columns that are arranged in another direction orthogonal to the one direction and each of which has M sub-pixels Vpix. The pixel rows extend along the X-direction, for example. The pixel columns extend along the Y-direction, for example. The values of M and N are determined according to a display resolution in the vertical direction and a display resolution in the horizontal direction, respectively. In the display area 21, scanning lines $12_1$, $12_2$, $12_3$, . . . , $12_M$ are arranged on a row-by-row basis, and signal lines $13_1$, $13_2$, $13_3$, . . . , $13_N$ are arranged on a column-by-column basis, corresponding to the array of the sub-pixels Vpix of M rows×N columns. Hereinafter, in some cases, the scanning lines $12_1$, $12_2$, $12_3$, . . . , $12_m$ will be denoted as scanning lines 12 as a representative term, and the signal lines $13_1$, $13_2$, $13_3$, . . . , $13_N$ will be denoted as signal lines 13 as a representative term. Also, in some cases, any three of the scanning lines $12_1$, $12_2$, $12_3$, . . . , $12_M$ will be denoted as scanning lines $12_m$, $12_{m+1}$, and $12_{m+2}$ (where m is a natural number satisfying m≤M−2), and any three of the signal lines $13_1$, $13_2$, $13_3$, . . . , $13_N$ will be denoted as signal lines $13_n$, $13_{n+1}$ and $13_{n+2}$ (where n is a natural number satisfying n≤N−2). Each of the M scanning lines $12_1$, $12_2$, $12_3$, . . . , $12_m$ will be referred to as a scanning line 12 in some cases when treated in a comprehensive sense. The scanning lines $12_m$, $12_{m+1}$, and $12_{m+2}$ in FIGS. 5A and 5B are some of the M scanning lines $12_1$, $12_2$, $12_3$, . . . , $12_M$. Each of the N signal lines $13_1$, $13_2$, $13_3$, . . . , $13_N$ will be referred to as a signal line 13 in some cases when treated in a comprehensive sense. The signal lines $13_n$, $13_{n+1}$, and $13_{n+2}$ in FIGS. 5A and 5B are some of the N signal lines $13_1$, $13_2$, $13_3$, . . . , $13_N$.

The drive element 3 is a circuit that is mounted, for example, by a chip-on-glass (COG) process, on a glass substrate (such as the glass substrate 1) of the display panel 2. The drive element 3 is coupled to, for example, an external control circuit and/or an external input power supply (which are not illustrated) through a flexible printed circuit (FPC) board (not illustrated). The control circuit transmits various signals to the drive element 3, the various signals being related to operation of the liquid crystal display device.

More specifically, the drive element 3 operates the display panel 2, for example, according to the various signals supplied from the control circuit. The control circuit outputs, for example, a master clock signal, a horizontal synchronizing signal, a vertical synchronizing signal, and a display image signal to the drive element 3. The drive element 3 serves as a gate driver and a source driver based on, for example, these signals. One or both of the gate driver and the source driver may be provided separately from the drive element 3 and formed of thin-film transistors (TFTs) (to be described later). In that case, one or both of the gate driver and the source driver may be electrically coupled to the drive element 3. The source driver and the gate driver may be electrically coupled to the different drive elements 3, or to the same drive element 3.

The gate driver latches digital data on a per horizontal period basis according to the horizontal synchronizing signal in synchronization with the vertical synchronizing signal and the horizontal synchronizing signal. The gate driver sequentially outputs the latched digital data for one line as a vertical scan pulse to each of the scanning lines 12 (scanning lines $12_1$, $12_2$, $12_3$, . . . , $12_M$) in the display area 21 so as to sequentially select the sub-pixels Vpix row by row. The gate driver sequentially outputs the digital data, for example, to the scanning lines $12_1$, $12_2$, . . . in the order from one end side to the other end side in the row direction of the display area 21. The gate driver can alternatively sequentially output the digital data to the scanning lines $12_M$, . . . in the order from the other end side to the one end side in the row direction of the display area 21.

The source driver receives the digital data of, for example, three 8-bit colors (such as red (R), green (G), and blue (B)) or four 8-bit colors (such as red (R), green (G), blue (B), and white (W)) from the control circuit. The digital data is generated based on original data of an image to be displayed in the display area 21. The source driver writes a video signal corresponding to the digital data to the sub-pixels Vpix in a row selected by the vertical scanning performed by the gate driver, through the signal lines 13 (signal lines $13_1$, $13_2$, $13_3$, . . . , $13_N$), one sub-pixel at a time, a plurality of sub-pixels at a time, or all the sub-pixels at a time. If each of the pixels Pix includes the sub-pixels Vpix of two colors or less, or the sub-pixels Vpix of five colors or more, digital data according to the number of colors only needs to be supplied based on the original data of the image.

Known driving methods for a liquid crystal display panel include, for example, a line inversion driving method, a dot inversion driving method, and a frame inversion driving method. The line inversion driving method is a driving method in which the polarity of a video signal is inverted at a time period of 1H (H is a horizontal period) corresponding to one line (one pixel row). The dot inversion driving method is a driving method in which the polarity of a video signal is alternately inverted between sub-pixels adjacent to each other in two intersecting directions (such as in the row and column directions). The frame inversion driving method is a driving method in which the polarity of video signals to be written to all the sub-pixels in one frame corresponding to one screen is inverted at once into the same polarity. The liquid crystal display device can employ any of the driving methods described above.

Wiring is formed in the display area 21, the wiring including the signal lines 13 and the scanning lines 12, for example. The signal lines 13 supply pixel signals as the display data to TFT elements Tr of the sub-pixels Vpix. The scanning lines 12 drive the TFT elements Tr. The signal lines 13 extend in a plane parallel to the surface of the glass substrate described above, and supply the pixel signals for displaying the image to the sub-pixels Vpix. Each of the sub-pixels Vpix includes corresponding one of the TFT elements Tr and a liquid crystal element LC. The TFT element Tr is constituted by a thin-film transistor, and, in this example, constituted by an n-channel metal oxide semiconductor (MOS) TFT. One of the source and the drain of the TFT element Tr is coupled to the signal line 13, and the other thereof is coupled to one end of the liquid crystal element LC. The gate of the TFT element Tr is coupled to the scanning line 12. The one end of the liquid crystal element LC is coupled to the other of the source and the drain of the TFT element Tr, and the other end thereof is coupled to the common electrode 15. A drive electrode driver (not illustrated) applies a drive signal to the common electrode 15. The drive electrode driver may be one component of the drive element 3, or may be an independent circuit.

The sub-pixel Vpix is coupled to the other sub-pixels Vpix belonging to the same row in the display area 21 through the scanning line 12. The scanning line 12 is coupled to the gate driver, and is supplied with the vertical scan pulse of the scan signal from the gate driver. The sub-pixel Vpix is also coupled to the other sub-pixels Vpix belonging to the same column in the display area 21 through the signal line 13. The signal line 13 is coupled to the source driver, and is supplied with the pixel signal from the source driver. The sub-pixel Vpix is further coupled to the other sub-pixels Vpix belonging to the same column of the display area 21 through the common electrode 15.

The gate driver applies the vertical scan pulse to the gates of the TFT elements Tr in the sub-pixels Vpix through each of the scanning lines 12 so as to sequentially select, as a target of display driving, one row (one horizontal line) among the sub-pixels Vpix formed in a matrix in the display area 21. The source driver supplies the pixel signals, through the signal lines 13, to the sub-pixels Vpix included in one horizontal line sequentially selected by the gate driver. These sub-pixels Vpix are configured such that the display is performed for one horizontal line according to the supplied pixel signals.

As described above, in the liquid crystal display device, the gate driver drives the scanning lines 12 so as to sequentially scan them, and thereby sequentially selects one horizontal line. In the liquid crystal display device, the source driver supplies the pixel signals to the sub-pixels Vpix belonging to one horizontal line through the signal lines 13 so as to perform the display on a per horizontal line basis. The drive electrode driver is configured to apply the drive signal to the common electrode 15 corresponding to the horizontal line when this display operation is performed.

In the display area 21, a color filter 31 is provided between the glass substrate 1a and the orientation film 32. The color filter 31 includes a black matrix 76a having a grid shape and openings 76b. The black matrix 76a is formed so as to cover the outer circumferences of the sub-pixels Vpix, as illustrated in FIGS. 5A and 5B. That is, the black matrix 76a is arranged at boundaries between the two-dimensionally arranged sub-pixels Vpix so as to have the grid shape. The black matrix 76a is formed of a material having a high light absorption factor. The openings 76b are openings formed by the grid shape of the black matrix 76a, and are arranged corresponding to the sub-pixels Vpix.

The openings 76b include color regions corresponding to sub-pixels for outputting three colors or four colors. If sub-pixels of three colors are provided, the openings 76b include color regions colored, for example, in three colors of red (R), green (G), and blue (B) as one configuration of a first color, a second color, and a third color, as illustrated in FIG. 6. The color regions colored, for example, in the three colors of red (R), green (G), and blue (B) are periodically arranged at the openings 76b.

In this manner, the display panel 2 serves as a display pixel portion that includes a plurality of pixels (pixels Pix) in which the sub-pixels (sub-pixels Vpix) for outputting red (R), green (G), and blue (B) are arranged, and that has a display area (such as the display area 21) in which the pixels are arranged in a matrix. In the present embodiment, input image signals to one pixel are specifically input image signals corresponding to an output of one of the pixels Pix that includes the sub-pixels Vpix of red (R), green (G), and blue (B). Hereinafter, red (R), green (G), and blue (B) will be simply referred to as R, G, and B, respectively, in some cases. Also, a combination of red (R), green (G), and blue (B) will be referred to as RGB in some cases.

The following describes a case where the openings 76b include color regions corresponding to sub-pixels for outputting four colors. Specifically, as illustrated in FIGS. 7 and 8, the openings 76b include color regions colored, for example, in three colors of red (R), green (G), and blue (B) as an example of a first color, a second color, and a third color, and color regions of a fourth color (such as white (W)). The color regions colored, for example, in the three colors of red (R), green (G), and blue (B) are periodically arranged at the openings 76b of the color filter 31. If the fourth color is white (W), coloring with the color filter 31 is not applied to the openings 76b for white (W). If the fourth color is other than white (W), the color filter 31 colors the openings 76b for the fourth color in a color employed as the fourth color.

In this manner, the display panel 2 serves as a display pixel portion that includes a plurality of pixels (pixels Pix) in which the sub-pixels (sub-pixels Vpix) for outputting red (R), green (G), blue (B), and the fourth color (such as white (W)) are arranged, and that has a display area (such as the display area 21) in which the pixels are arranged in a matrix. In the present embodiment, the input image signals to one pixel is specifically input image signals corresponding to an output from one of the pixels Pix that includes the sub-pixels Vpix of red (R), green (G), blue (B), and the fourth color (white (W)). Hereinafter, red (R), green (G), blue (B), and white (W) will be simply referred to as R, G, B, and W, respectively, in some cases. Also, a combination of red (R), green (G), blue (B), and white (W) will be referred to as RGBW in some cases.

Examples of the arrangement of RGBW in each of the pixels Pix include an arrangement in which red (R), green (G), blue (B), and white (W) are arranged in the order of the upper left, the lower left, the upper right, and the lower right in the plan view, as illustrated in FIG. 7. Examples thereof also include an arrangement in which red (R), blue (B), green (G), and white (W) are arranged in the order of the upper left, the lower left, the upper right, and the lower right in the plan view, as illustrated in FIG. 8.

The color filter 31 may have a combination of other colors as long as being colored in different colors from each other. In the color filter 31, the luminance of the color regions of green (G) is generally higher than the luminance of the color regions of red (R) and blue (B). If the fourth color is white (W), a light-transmitting resin may be used in the color filter 31 to provide the white color.

In the display area 21, the scanning lines 12 and the signal lines 13 are arranged in a region overlapping the black matrix 76a of the color filter 31 when viewed from a direction orthogonal to the front side of the display area 21. That is, the scanning lines 12 and the signal lines 13 are hidden behind the black matrix 76a when viewed from the direction orthogonal to the front side. Regions of the display area 21 where the black matrix 76a is not arranged serve as the openings 76b.

As described with reference to FIGS. 4, 5A, and 5B, the first substrate 5 is provided with the scanning lines 12 along the X-direction and the signal lines 13 along the Y-direction. The scanning lines 12 and the signal lines 13 intersect in a grid pattern. One cell of the grid corresponds to each of the pixels. The pixel electrode 17 included in the sub-pixel Vpix is stacked on the upper layer side of the common electrode 15 with an interlayer insulating film interposed therebetween, and includes a plurality of strip electrodes forming a comb-tooth pattern. In the sub-pixel Vpix, a voltage is applied between the pixel electrode 17 and the common electrode 15, and thus the transverse electric field is applied to the liquid crystals. Thus, the orientation state of the liquid crystals is switched. The sub-pixel Vpix includes a thin-film transistor (TFT) 14 as a component for applying a voltage to the pixel electrode 17. The TFT 14 is covered with an interlayer insulating film 37. A gate G of the TFT 14 is coupled to the scanning line 12 of a pixel row in which the sub-pixel Vpix including the TFT 14 lies. A semiconductor thin film is formed above the gate G with a gate insulating film 35 interposed therebetween, and is divided into the source and the drain of the TFT 14. The source of the TFT 14 is coupled to the signal line 13 of a pixel column in which the sub-pixel Vpix including the TFT 14 lies. The drain of the TFT 14 is coupled to the pixel electrode 17 through a contact 30 formed in a contact hole 36. The common electrode 15 is coupled to a common potential. The drive signal may be applied as the common potential to the common electrode 15.

When the voltage corresponding to the video signal is applied to the pixel electrode 17 side of the common electrode 15 coupled to the common potential, the transverse electric field is applied to the liquid crystal layer 10, and thus, the orientation state of the liquid crystal molecules is switched to change the level of scattering of light. This process modulates the optical transmittance of the liquid crystal layer 10 according to the video signal. The transverse electric field technique is employed in an in-plane switching (IPS) mode in which comb-tooth-like electrodes are combined in the same plane. The IPS mode includes, for example, the FFS mode in which the insulating film isolates the common electrode 15 from the pixel electrode 17. However, the transverse electric field technique may be employed in other modes. The modes that can employ the transverse electric field technique include all modes in which the switching is performed in a substrate plane.

Figure 11:
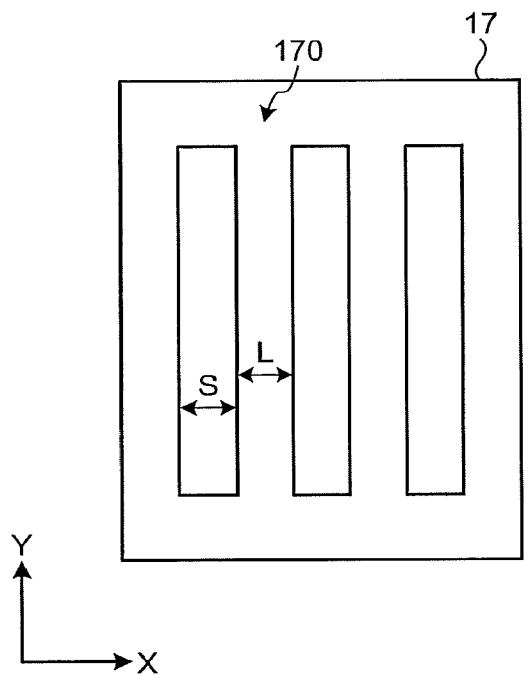
FIG. 11 is an explanatory diagram schematically illustrating a pixel electrode, the width of a strip electrode of the pixel electrode, and the spacing between the strip electrodes.
Figure 12:
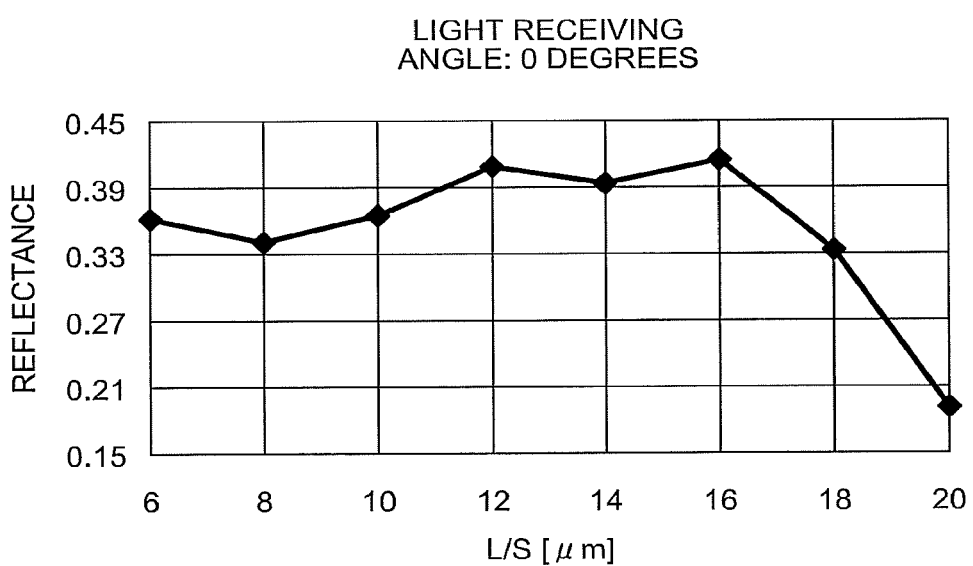
FIG. 12 is a graph illustrating a relation of the width of the strip electrode of the pixel electrode and the spacing between the strip electrodes with reflectance of the pixel electrode.

The following describes the width of each of the strip electrodes and the spacing between the strip electrodes. FIG. 11 is an explanatory diagram schematically illustrating the pixel electrode 17, the width of the strip electrode 170 of the pixel electrode 17, and the spacing between the strip electrodes 170. FIG. 12 is a graph illustrating a relation of the width of the strip electrode 170 of the pixel electrode 17 and the spacing between the strip electrodes 170 with reflectance of the pixel electrode. The reflectance has been verified to change with the width of the strip electrode 170 and the spacing between the strip electrodes 170. Specifically, as illustrated in FIG. 11, letting L denote the width of the strip electrode 170 and S denote the spacing between the strip electrodes 170, L and S are set so that L≤18 [µm] and S≤18 [µm]. These settings can obtain the reflectance higher than that in the case where L>18 [µm] and S>18 [µm]. In this manner, the reflectance can be increased by setting the width in the predetermined direction of the strip electrode of the first electrode portion (such as the pixel electrode 17) and the spacing in the predetermined direction ori between the strip electrodes of the first electrode portion to 18 [µm] or smaller. The reflectance can be particularly increased by setting the width in the predetermined direction of the strip electrode of the first electrode portion and the spacing in the predetermined direction ori between the strip electrodes of the first electrode portion to 16 [µm]. The relation L=S may be satisfied or unsatisfied.

FIGS. 13 to 16 are schematic diagrams illustrating further specific exemplary configurations of each of the sub-pixels Vpix included in the liquid crystal display device illustrated in FIG. 4. Configurations 100A, 100B, 100C, and 100D illustrated in FIGS. 13, 14, 15, and 16, respectively, are obtained by adding an electrode at the second substrate facing the first substrate across the liquid crystal layer 10 to a configuration 100 of the liquid crystal display device described with reference to FIGS. 4 to 10. The first substrate corresponds to, for example, the first substrate 5. The second substrate corresponds to, for example, any one of second substrates 6a, 6b, 6c, and 6d illustrated in FIGS. 13 to 16. Specifically, in the configurations 100A, 100B, and 100C illustrated in FIGS. 13, 14, and 15, respectively, a floating electrode is provided at the glass substrate 1a. In the configuration 100D illustrated in FIG. 16, an electrode for generating a transverse electric field in the predetermined direction ori is provided at the glass substrate 1a. The electrode provided on the glass substrate 1a is an ITO electrode formed, for example, by sputtering, but is not limited thereto, and can be changed to other electrodes as appropriate.

The configurations 100A, 100B, 100C, and 100D illustrated in FIGS. 13, 14, 15, and 16, respectively, are the same as the configuration 100 illustrated in FIG. 10, except the configuration provided on the side of the glass substrate 1a. That is, the first substrate 5 and the first electrode portion (such as the pixel electrode 17) provided at the first substrate 5 that are illustrated in FIGS. 10, 13, 14, 15, and 16, and FIGS. 17 to 21 (to be described later) have the same configuration. In FIGS. 10, 13, 14, 15, and 16, and FIGS. 17 to 21 (to be described later), the second substrate is assigned with reference numerals 6, 6a, 6b, 6c, and 6d, respectively, in order to distinguish the configurations provided at the glass substrate 1a. The function of the liquid crystal display device of a transverse electric field type and a light scattering type described with reference to FIGS. 1 to 3 is implemented even when the second substrate 6 is replaced with any one of the second substrates 6a, 6b, 6c, and 6d.

Figure 13:
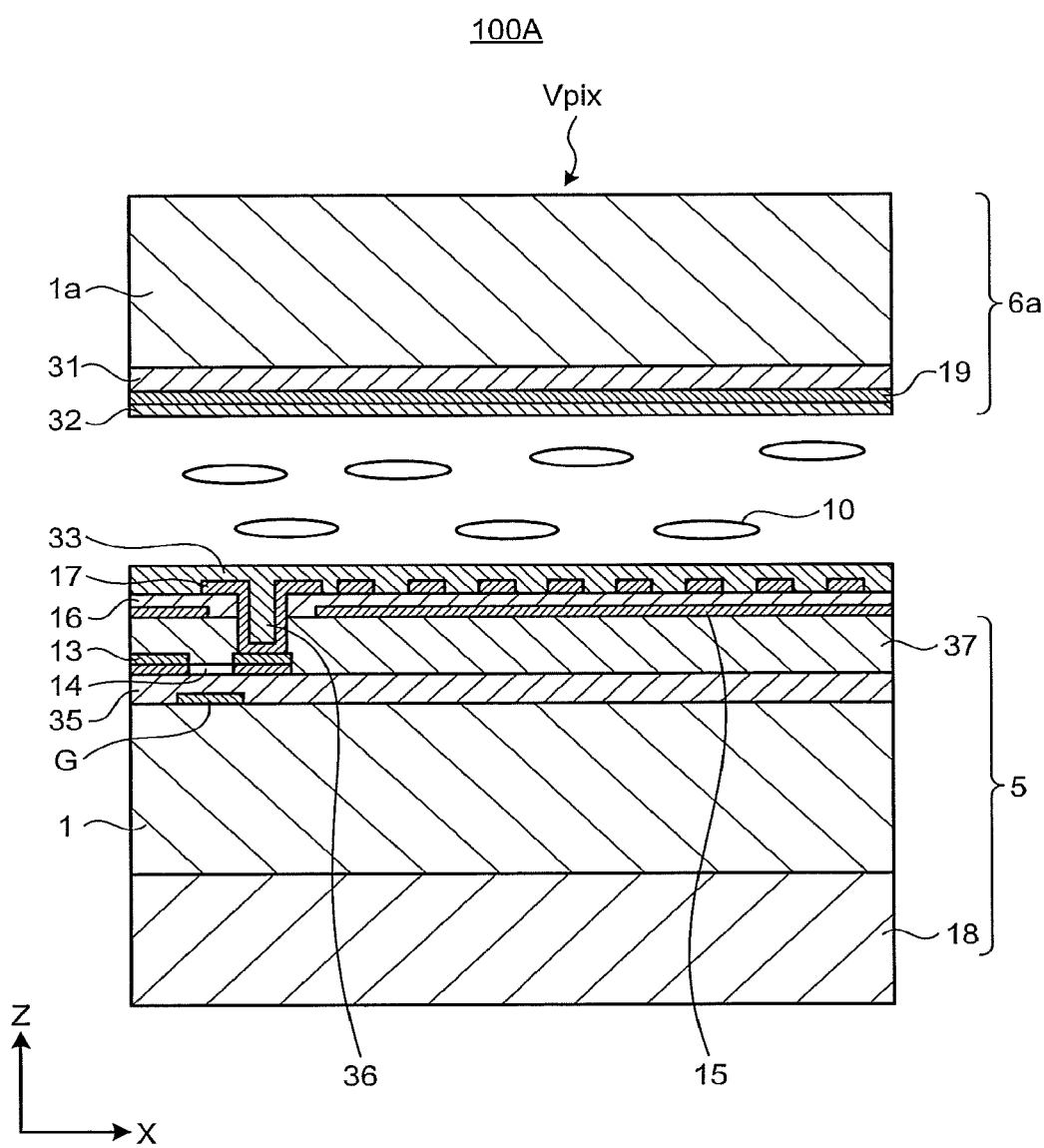
FIG. 13 is a schematic diagram illustrating a further specific exemplary configuration of each of the sub-pixels included in the liquid crystal display device illustrated in FIG. 4.
Figure 14:
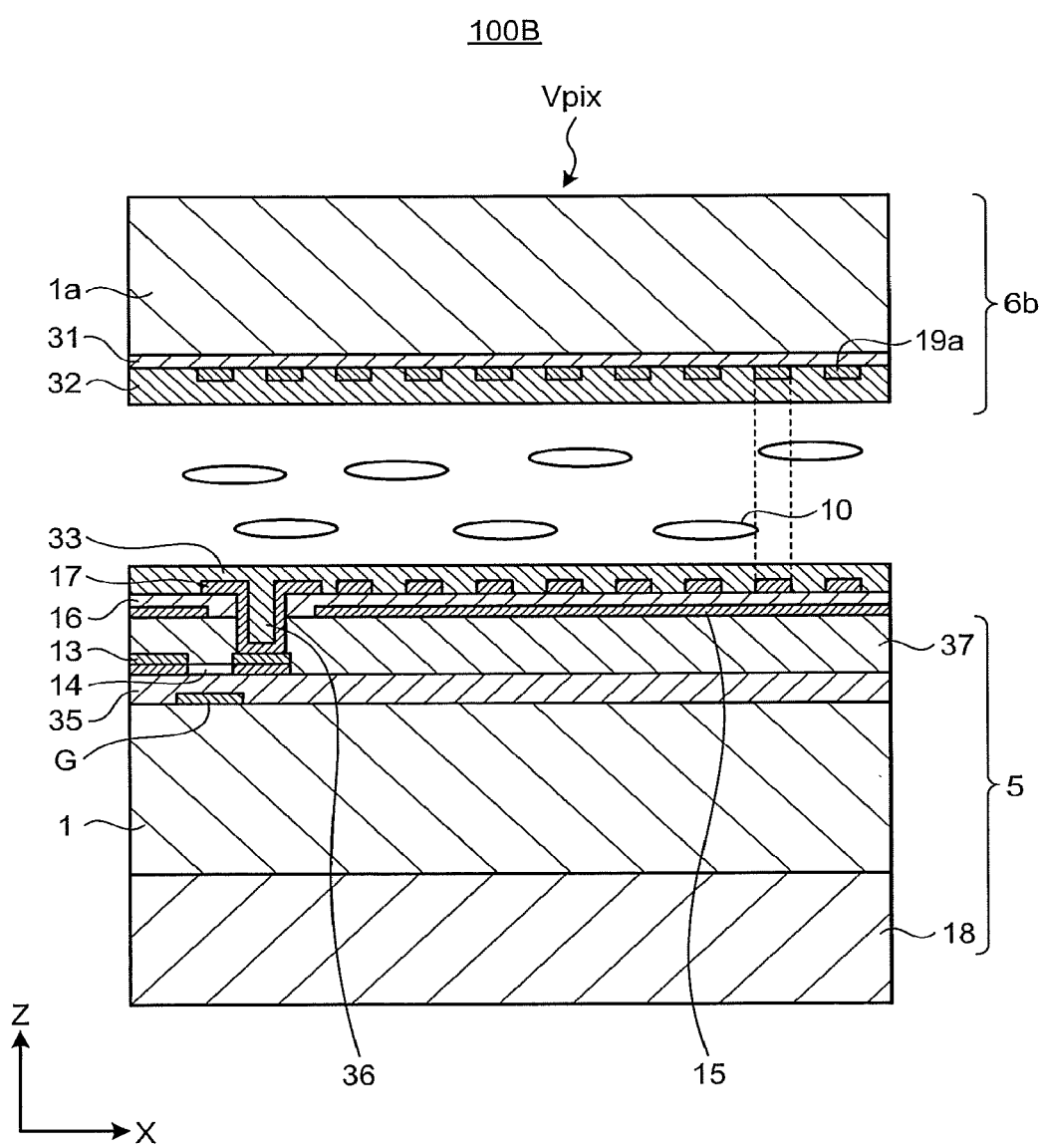
FIG. 14 is a schematic diagram illustrating another further specific exemplary configuration of each of the sub-pixels included in the liquid crystal display device illustrated in FIG. 4.
Figure 15:
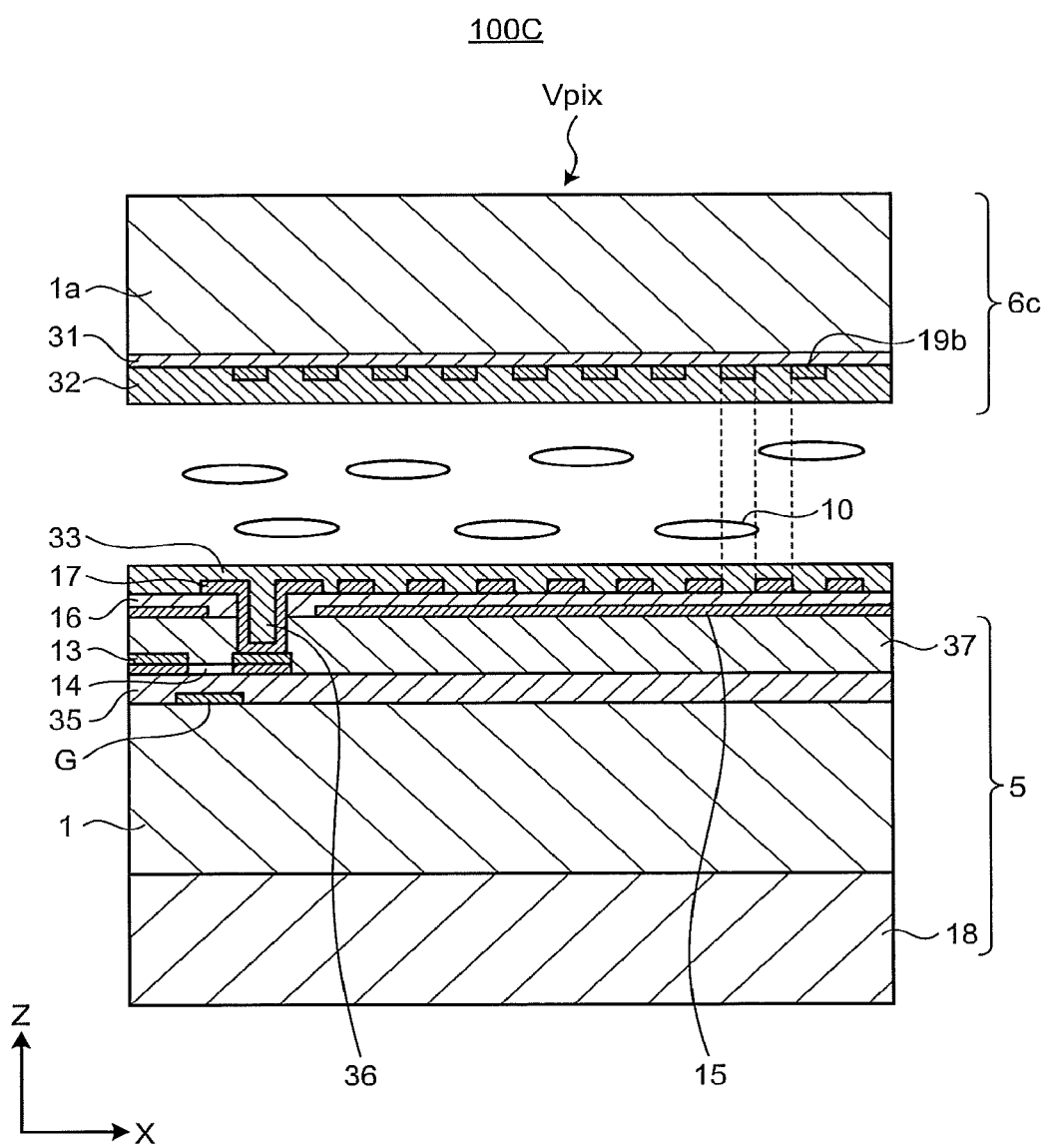
FIG. 15 is a schematic diagram illustrating still another further specific exemplary configuration of each of the sub-pixels included in the liquid crystal display device illustrated in FIG. 4.
Figure 16:
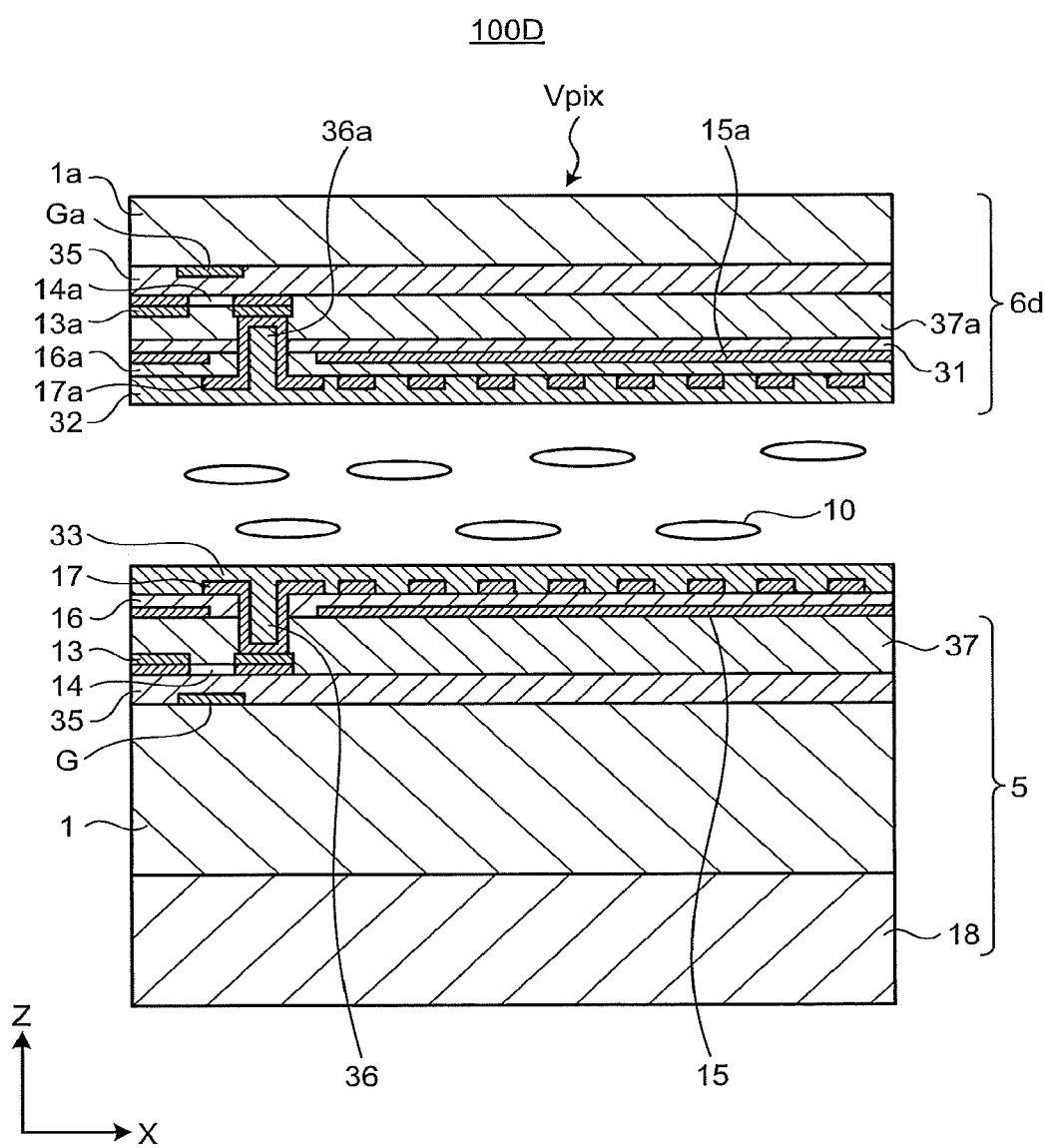
FIG. 16 is a schematic diagram illustrating still another further specific exemplary configuration of each of the sub-pixels included in the liquid crystal display device illustrated in FIG. 4.

Specifically, in the case of the configuration 100A illustrated in FIG. 13, an electrode 19 is provided in the whole area corresponding to at least the display area on a surface on the liquid crystal layer 10 side of the glass substrate 1a. Alternatively, the electrode 19 is provided in the whole area on the surface on the liquid crystal layer 10 side of the glass substrate 1a. In the configurations illustrated in FIGS. 14 to 16, a second electrode portion is provided on the surface on the liquid crystal layer 10 side of the glass substrate 1a. The second electrode portion includes a plurality of strip electrodes arranged in the predetermined direction ori. In the case of the configuration 100B illustrated in FIG. 14, the strip electrodes of the first electrode portion (such as the pixel electrode 17) and strip electrodes 19a of the second electrode portion are arranged in positions facing each other on both sides of the liquid crystal layer 10. FIG. 14 schematically illustrates the configuration in which the strip electrode of the first electrode portion (such as the pixel electrode 17) and the strip electrode 19a of the second electrode portion face each other in an area sandwiched in the X-direction between a pair of two dashed lines. In the case of the configuration 100C illustrated in FIG. 15, the strip electrode of the first electrode portion and strip electrode 19b of the second electrode portion are arranged alternately in the predetermined direction ori with the liquid crystal layer 10 therebetween. FIG. 15 schematically illustrates the state where the strip electrode of the first electrode portion (such as the pixel electrode 17) and the strip electrode 19a of the second electrode portion do not face each other in an area sandwiched in the X-direction between a pair of two dashed lines, but are alternately arranged. In the case of the configuration 100D illustrated in FIG. 16, the same multilayered structure as that of the glass substrate 1 is provided on the liquid crystal layer 10 side of the glass substrate 1a. More specifically, the glass substrate 1a is provided with a common electrode 15a and a pixel electrode 17a to which a voltage is applied in the same way as the relation between the common electrode 15 and the pixel electrode 17. The configuration of a signal line 13a, a TFT 14a, the common electrode 15a, an insulating film 16a, the pixel electrode 17a as the second electrode portion, a contact hole 36a, an interlayer insulating film 37a, and a gate Ga of the glass substrate 1a in the configuration 100D illustrated in FIG. 16 is the same as the configuration of the signal line 13, the TFT 14, the common electrode 15, the insulating film 16, the pixel electrode 17 as the first electrode portion, the contact hole 36, the interlayer insulating film 37, and the gate G of the glass substrate 1. However, in the configuration illustrated in FIG. 16, the arrangement of the components stacked on the glass substrate 1a is symmetrical to the arrangement of the components stacked on the glass substrate 1 across the liquid crystal layer 10. The direction of the transverse electric field generated by the pixel electrode 17 is the same as the direction of the transverse electric field generated by the pixel electrode 17a.

In the configurations 100B and 100C respectively illustrated in FIGS. 14 and 15, the color filter 31 is provided on the glass substrate 1a, and the strip electrodes 19a and 19b are stacked on the color filter 31. The orientation film 32 is stacked on the strip electrodes 19a and 19b.

In the example illustrated in FIG. 16, the orientation film 32 is stacked on the second electrode portion (pixel electrode 17a).

The color filter 31 is not limited to the configuration described above, as long as being provided on the display surface side (such as on the side of the second substrate 6a, 6b, or 6c) of the liquid crystal layer 10.

In the configuration 100D illustrated in FIG. 16, the color filter 31 is provided between the interlayer insulating film 37a and the insulating film 16a. More specifically, a part of the interlayer insulating film 37a may be used also as the color filter 31. The configuration 100D may be a configuration in which the color filter 31 is provided on the glass substrate 1a side of the orientation film 32.

In the configurations 100B and 100C illustrated in FIGS. 14 and 15, respectively, the strip electrodes 19a and 19b serving as floating electrodes may be electrodes that are individually independent and arranged along the predetermined direction, or may be electrodes that are integrated as a comb-tooth-like electrode like the pixel electrode 17. That is, the second electrode portion in each of the configurations 100B and 100C refers to a collection of a plurality of strip electrodes, and the specific form of the second electrode portion is not limited to being either an integrated electrode or not.

Figure 17:
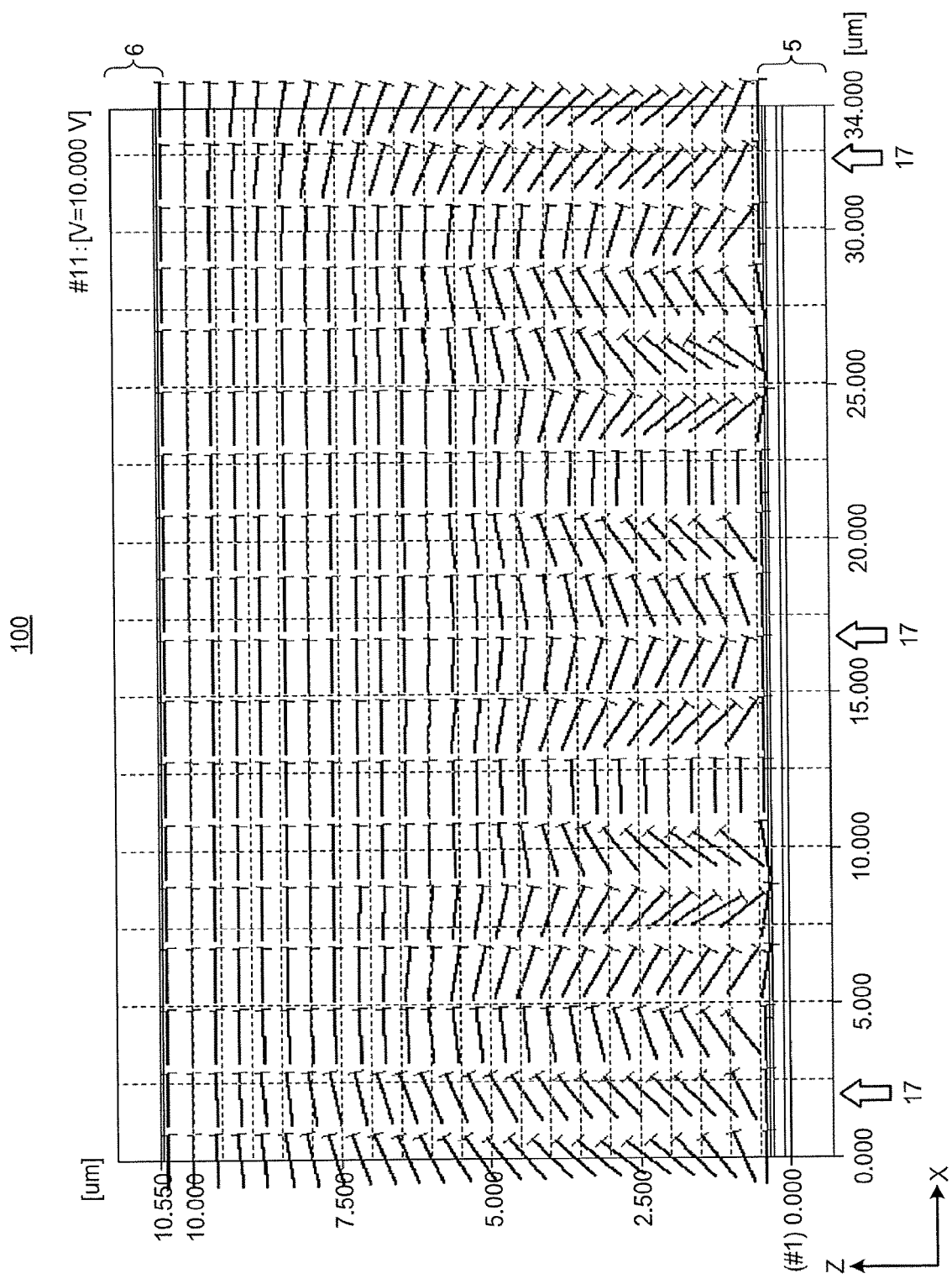
FIG. 17 illustrates a simulation screen representing twist of liquid crystal molecules when the configuration illustrated in FIG. 10 is in operation.
Figure 18:
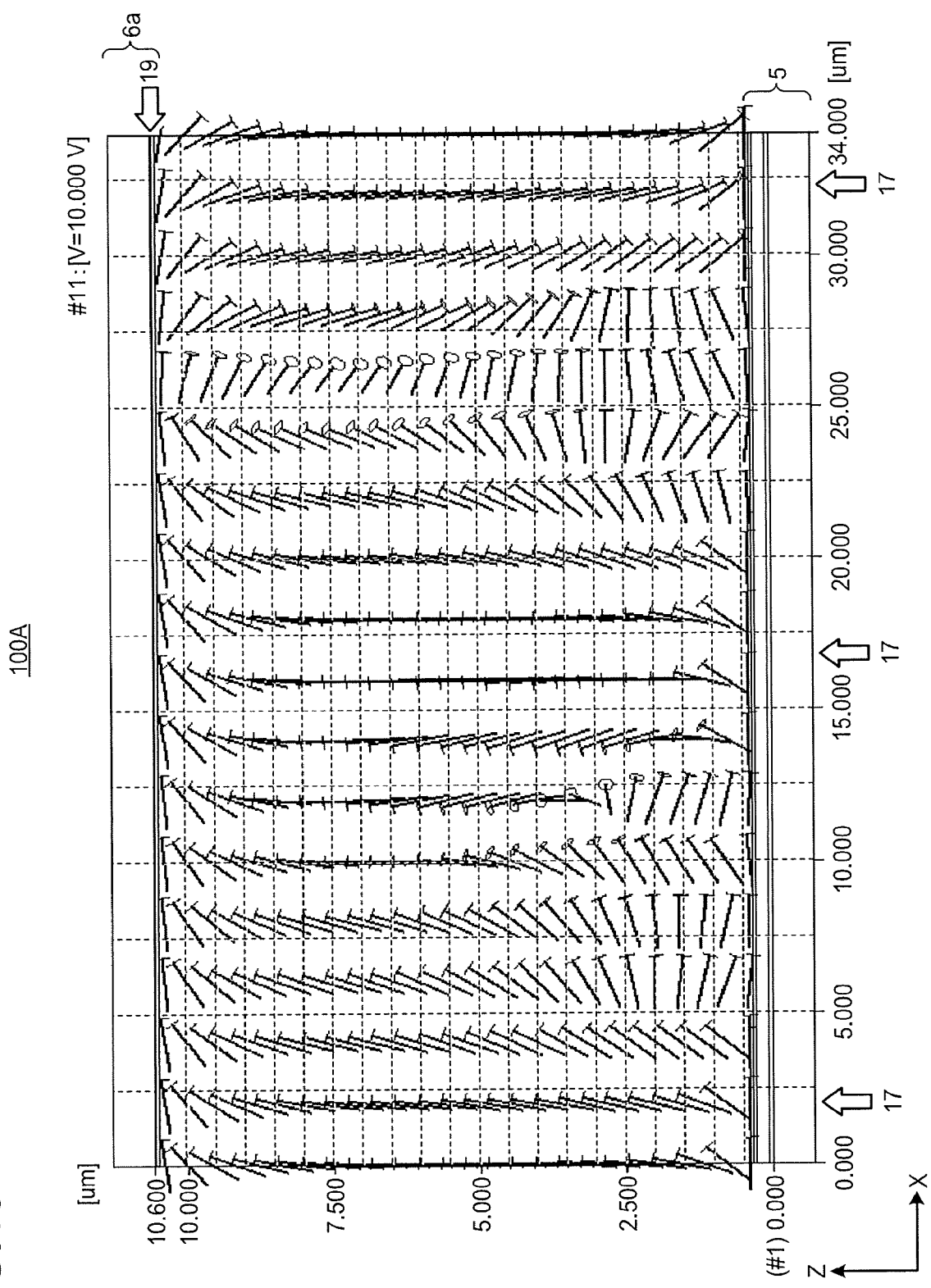
FIG. 18 illustrates a simulation screen representing twist of the liquid crystal molecules when the configuration illustrated in FIG. 13 is in operation.
Figure 19:
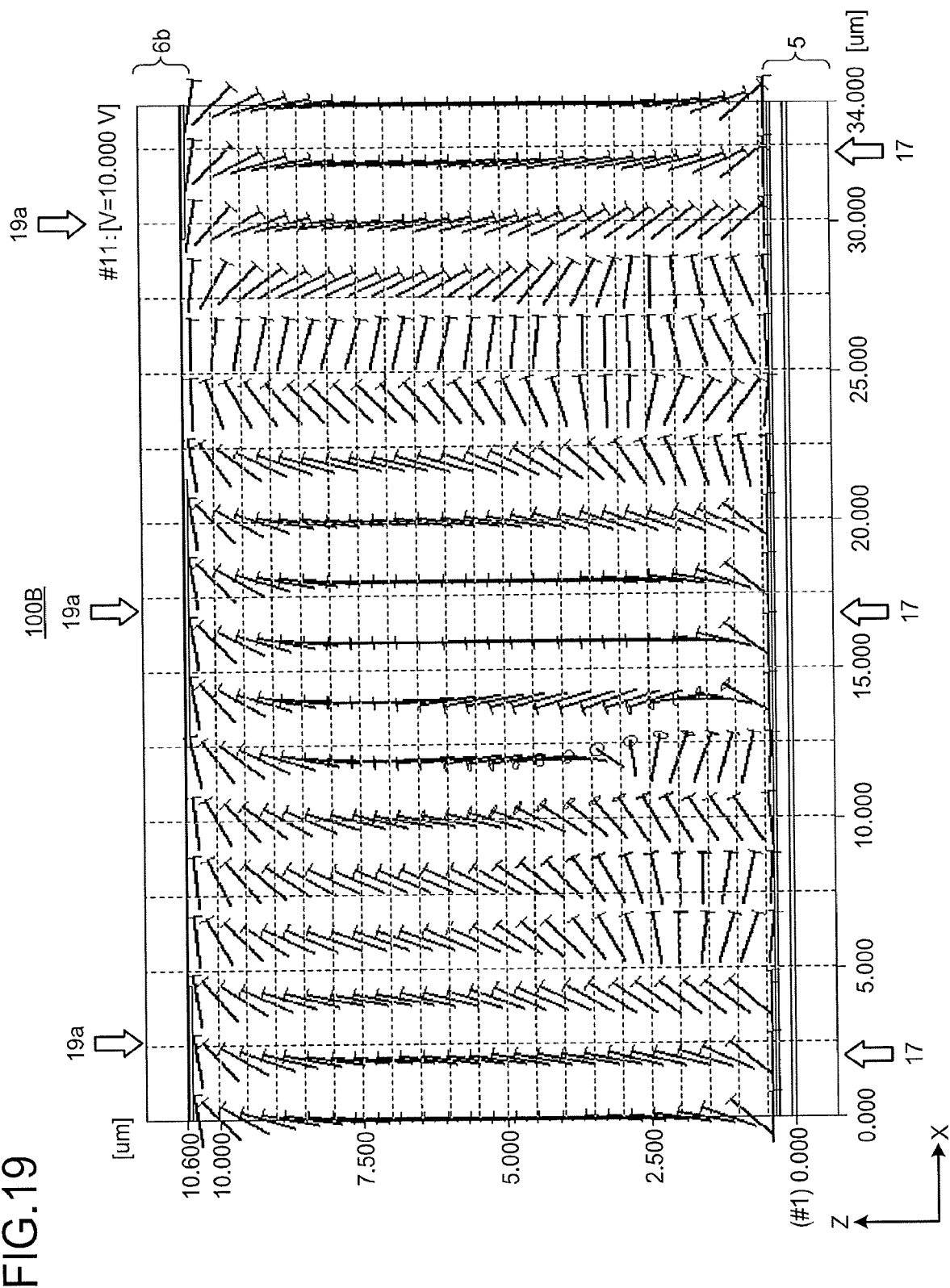
FIG. 19 illustrates a simulation screen representing twist of the liquid crystal molecules when the configuration illustrated in FIG. 14 is in operation.
Figure 20:
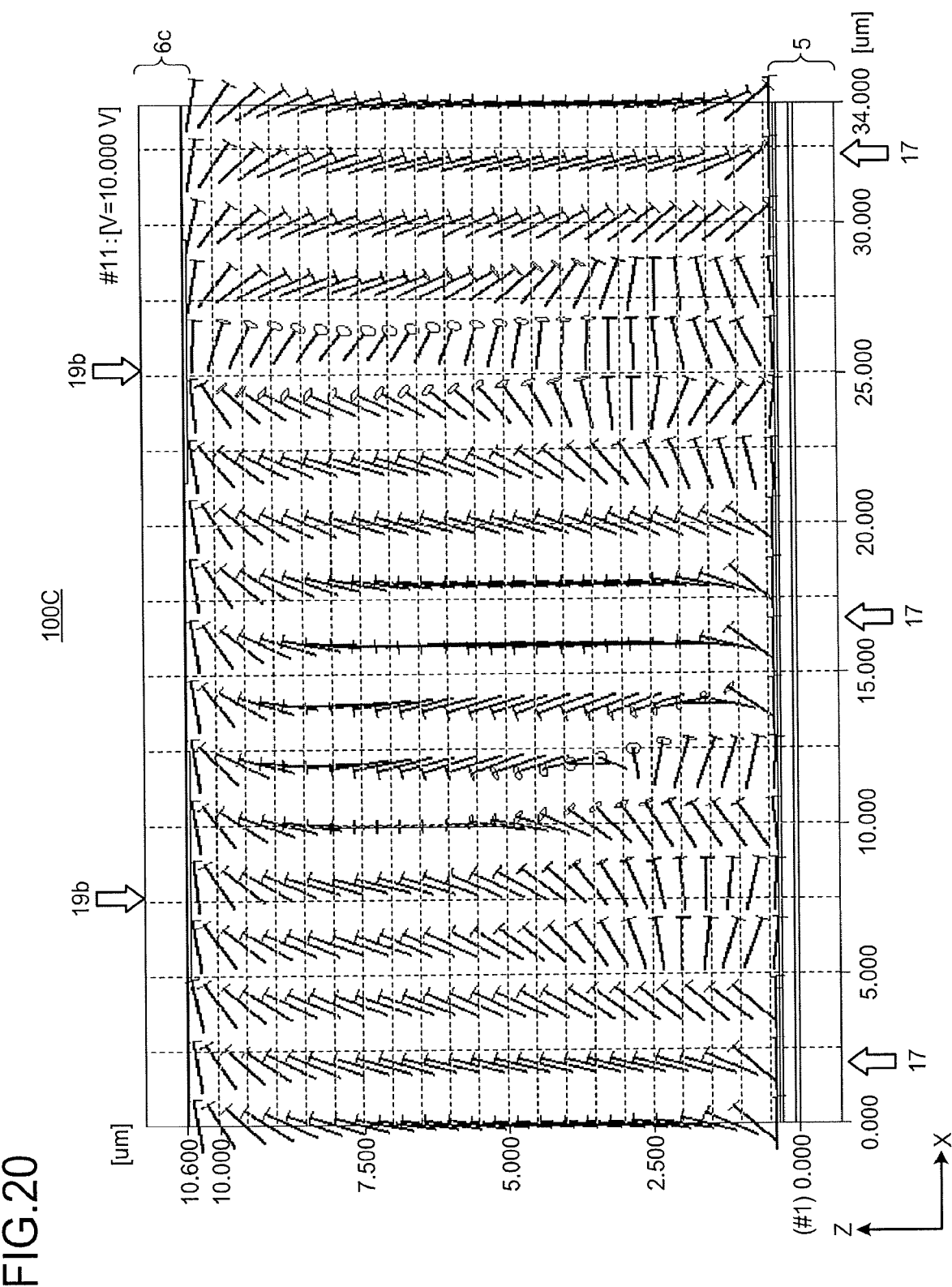
FIG. 20 illustrates a simulation screen representing twist of the liquid crystal molecules when the configuration illustrated in FIG. 15 is in operation.
Figure 21:
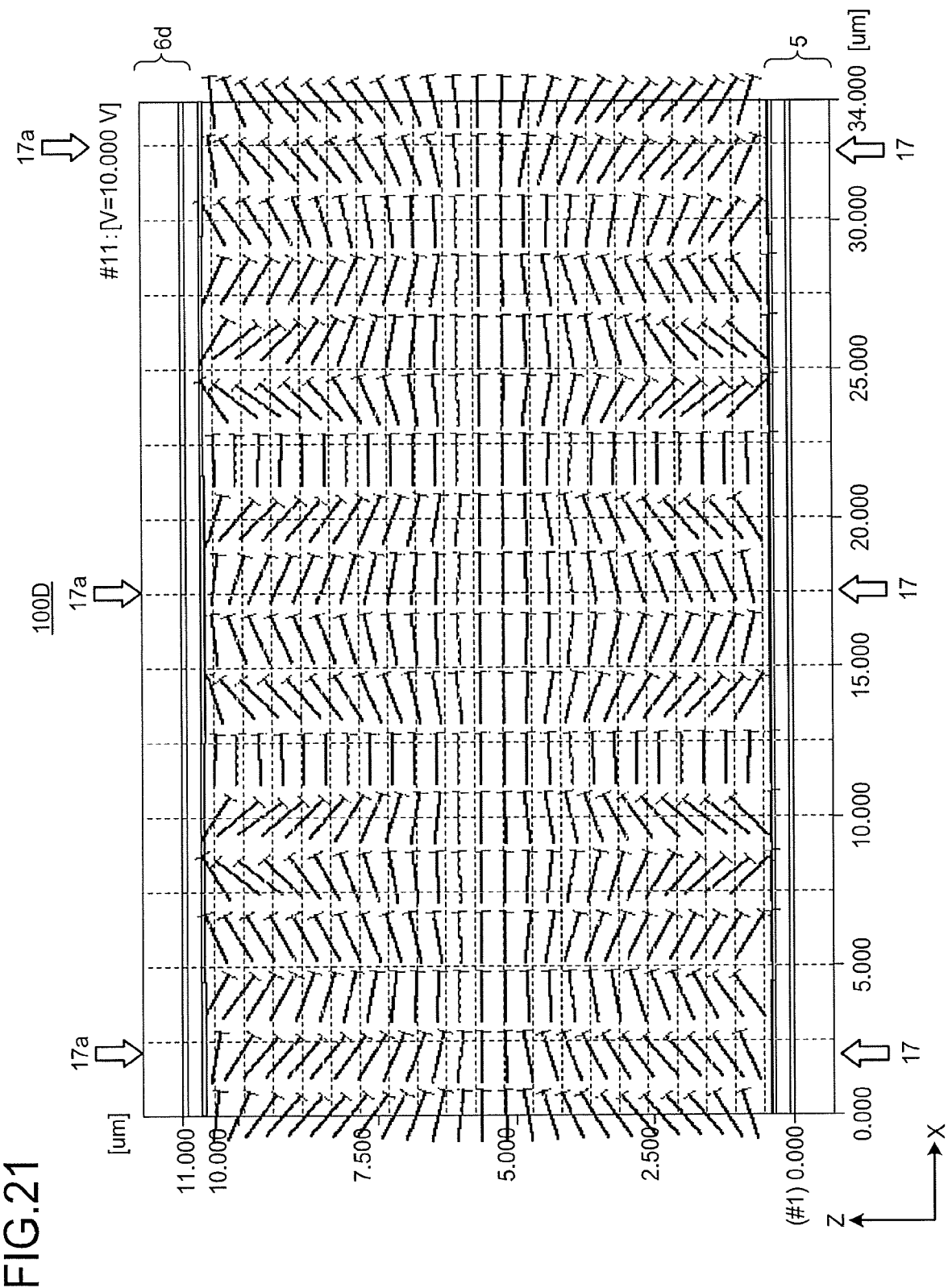
FIG. 21 illustrates a simulation screen representing twist of the liquid crystal molecules when the configuration illustrated in FIG. 16 is in operation.

The following describes twist of the liquid crystal molecules in operations of the configuration 100 illustrated in FIG. 10, and the configurations 100A, 100B, 100C, and 100D illustrated in FIGS. 13, 14, 15, and 16, respectively, with reference to FIGS. 17, 18, 19, 20, and 21. FIG. 17 illustrates a simulation screen representing the twist of the liquid crystal molecules when the configuration 100 illustrated in FIG. 10 is in operation. FIG. 18 illustrates a simulation screen representing twist of the liquid crystal molecules when the configuration 100A illustrated in FIG. 13 is in operation. FIG. 19 illustrates a simulation screen representing twist of the liquid crystal molecules when the configuration 100B illustrated in FIG. 14 is in operation. FIG. 20 illustrates a simulation screen representing twist of the liquid crystal molecules when the configuration 100C illustrated in FIG. 15 is in operation. FIG. 21 illustrates a simulation screen representing twist of the liquid crystal molecules when the configuration 100D illustrated in FIG. 16 is in operation.

The following describes specific conditions in the simulations of FIGS. 17 to 21. The orientation films 32 and 33 are orientation films that are made of PI and have a film thickness of 50 [nm] and a dielectric constant of 4.3. The pixel electrode 17 has a thickness of 50 [nm], and the strip electrodes thereof have the width (L) of 9 [μm] and the spacing (S) therebetween of 8 [μm]. The interlayer insulating film 37 is an insulating film having a film thickness of 300 [nm] and a dielectric constant of 6.4. The common electrode 15 has a thickness of 50 [nm]. The liquid crystal layer 10 is a liquid crystal layer having Δn of 0.18 and a gap of 10 [μm]. Of the specific conditions in the simulations of FIGS. 18 to 20, the thickness of the electrode on the glass substrate 1a side is 50 [nm]. In the simulation of FIG. 21, the same specific conditions as those for the pixel electrode 17, the interlayer insulating film 37, and the common electrode 15 described above are set for the corresponding components provided on the glass substrate 1a side. A difference method is used to perform the simulation. The conditions for the simulations are merely exemplary specific conditions, and the present invention is not limited thereto.

As illustrated in FIG. 17, in the case of the configuration 100 illustrated in FIG. 10, twisted liquid crystal molecules are present near the strip electrodes of the pixel electrode 17, but some of the liquid crystal molecules located far from the strip electrodes are hardly or not twisted. In particular, the liquid crystal molecules located alongside the second substrate 6 are hardly twisted. In contrast, as illustrated in FIGS. 18, 19, and 20, in the case of the configurations 100A, 100B, and 100C, not only the liquid crystal molecules near the strip electrodes of the pixel electrode 17 but also almost all the liquid crystal molecules of the liquid crystal layer 10 are twisted. In addition, the twisting changes the orientation directions of the liquid crystal molecules more significantly. As illustrated in FIG. 21, in the case of the configuration 100D, the liquid crystal molecules are driven from both sides of the liquid crystal layer 10, and are thereby twisted on both the first substrate 5 side and the second substrate 6d side. In this manner, the configurations 100A, 100B, 100C, and 100D can increase the twisted liquid crystal molecules as compared to the configuration 100.

FIG. 22 is a table illustrating the reflectances of the configurations 100A, 100B, 100C, 100D, and 100 illustrated in FIGS. 13, 14, 15, 16, and 10. When a certain gradation (such as white) is output, the reflectances are 20.5, 23, 25, and 23 in the cases of the configurations 100A, 100B, 100C, and 100D, respectively, and these values are higher than the reflectance (19) of the configuration 100, as illustrated in FIG. 22. In this manner, providing the electrode at the second substrate facing the first substrate across the liquid crystal layer 10 can further improve the reflectance. The first substrate corresponds to, for example, the first substrate 5. The second substrate corresponds to, for example, any one of the second substrates 6a, 6b, 6c, and 6d illustrated in FIGS. 13 to 16. The electrode provided at the second substrate corresponds to, for example, the electrode 19, the strip electrodes 19a or 19b, or the pixel electrode 17a.

The measurement results illustrated in FIG. 22 are obtained, for example, by measuring the diffuse reflectance using a spectrophotometric colorimeter, but the specific measuring method is not limited thereto, and can be changed to other methods as appropriate.

As described above, the liquid crystal display device of the present embodiment includes the first substrate (such as the first substrate 5), the liquid crystal layer 10, and the second substrate (such as any one of the second substrates 6a, 6b, 6c, and 6d illustrated in FIGS. 13 to 16). The first substrate is provided with the first electrode portion (such as the pixel electrode 17). The first electrode portion includes the strip electrodes arranged in the predetermined direction ori, and generates the transverse electric field in the predetermined direction ori. The liquid crystal molecules of the liquid crystal layer 10 are oriented in the predetermined direction ori in the state where the transverse electric field is not generated. The second substrate faces the first substrate across the liquid crystal layer 10. The second substrate is provided with the electrode. Such a configuration can further improve the reflectance. This improvement can reduce an influence of azimuth angle dependence of the view angle of the crystal display device on the angle of orientation caused by the initial orientation direction, and thus can increase the view angle.

The electrode provided at the second substrate includes the strip electrodes arranged in the predetermined direction ori. As a result, more liquid crystal molecules can be twisted between the strip electrodes of the first substrate and the strip electrodes of the second substrate, so that the reflectance can be further improved.

The generation of the transverse electric field in the predetermined direction ori by the second electrode portion can twist the liquid crystal molecules from both sides of the liquid crystal layer 10, so that the reflectance can be further improved.

The electrode provided at the second substrate is formed at least in the whole display area. As a result, the reflectance can be further improved with a simpler configuration.

Since the electrode provided at the second substrate is a floating electrode, no configuration is required to apply a voltage to the electrode provided at the second substrate, so that the reflectance can be further improved with a simpler configuration.

The width in the predetermined direction of the strip electrode of the first electrode portion and the spacing in the predetermined direction ori between the strip electrodes of the first electrode portion are 18 [μm] or smaller. As a result, the reflectance can be further improved.

The liquid crystal display device according to the present invention may include a first substrate including a first electrode and a second electrode facing the first electrode, a second substrate facing the first substrate, a liquid crystal layer including liquid crystal molecules held between the first substrate and the second substrate, and a third electrode provided at the second substrate. The second electrode may be located closer to the liquid crystal layer than the first electrode is, and may include a plurality of open regions. The liquid crystal layer may be configured to exhibit transparency when no voltage is applied thereto and to exhibit a scattering property when a voltage is applied thereto. In this case, each of the first and the second electrodes corresponds to a pixel electrode or a drain electrode. Specifically, the first electrode corresponds to, for example, the common electrode 15, and the second electrode corresponds to the pixel electrode 17. The third electrode corresponds to an electrode on the second substrate side (such as the electrode 19, the strip electrodes 19a or 19b, or the second electrode portion 17a in any one of FIGS. 13 to 16).

Other operational advantages accruing from the aspects described in the present embodiment that are obvious from the description in this specification, or that are appropriately conceivable by those skilled in the art will naturally be understood as accruing from the present invention.

The present disclosure includes the following aspects:
(1) A liquid crystal display device comprising:
 a first substrate provided with a first electrode portion that includes a plurality of strip electrodes arranged in a first direction and that is configured to generate a transverse electric field in the first direction;
 a liquid crystal layer in which liquid crystal molecules are oriented in the first direction when the transverse electric field is not generated;
 a second substrate facing the first substrate across the liquid crystal layer; and
 an electrode provided at the second substrate.
(2) The liquid crystal display device according to (1), wherein the electrode is a second electrode portion including a plurality of strip electrodes arranged in the first direction.
(3) The liquid crystal display device according to (2), wherein the strip electrode of the first electrode portion and the strip electrode of the second electrode portion are arranged alternately in the first direction with the liquid crystal layer therebetween.
(4) The liquid crystal display device according to (2), wherein the strip electrode of the first electrode portion and the strip electrode of the second electrode portion face each other with the liquid crystal layer therebetween.
(5) The liquid crystal display device according to (4), wherein the second electrode portion is configured to generate a transverse electric field in the first direction.
(6) The liquid crystal display device according to (1), wherein the electrode is provided in a whole area corresponding to a display area of the second substrate.
(7) The liquid crystal display device according to any one of (1) to (4) or (6), wherein the electrode is a floating electrode.
(8) The liquid crystal display device according to any one of (1) to (7), comprising:
 a pixel electrode serving as the first electrode portion; and
 a common electrode that is provided spaced from the pixel electrode with an insulating film therebetween, wherein
 the transverse electric field is generated between the pixel electrode and the common electrode.
(9) The liquid crystal display device according to any one of (1) to (8), wherein the electrode is provided between the second substrate and the liquid crystals.
(10) The liquid crystal display device according to any one of (1) to (9), wherein a width in the first direction of each of the strip electrodes of the first electrode portion and a spacing in the first direction between the strip electrodes of the first electrode portion are 18 μm or smaller.
(11) The liquid crystal display device according to any one of (1) to (10), wherein the liquid crystal molecules have positive dielectric anisotropy.
(12) A liquid crystal display device comprising:
 a first substrate including a first electrode and a second electrode facing the first electrode;
 a second substrate facing the first substrate;
 a liquid crystal layer including liquid crystal molecules held between the first substrate and the second substrate; and
 a third electrode provided at the second substrate, wherein
 the second electrode is located closer to the liquid crystal layer than the first electrode is, and has a plurality of open regions, and
 the liquid crystal layer is configured to exhibit transparency when no voltage is applied thereto and to exhibit a scattering property when a voltage is applied thereto.

What is claimed is:
1. A liquid crystal display device comprising:
 a first substrate provided with a pixel electrode portion that includes a plurality of pixel strip electrodes arranged in a first direction;

a common electrode that is provided spaced from the pixel electrode portion with an insulating film therebetween;

a liquid crystal layer in which liquid crystal molecules are oriented in a first orientation direction when a transverse electric field is not generated;

a second substrate facing the first substrate across the liquid crystal layer; and a plurality of floating strip electrodes provided at the second substrate, wherein the transverse electric field is generated between the pixel electrode portion and the common electrode in the first direction and between the pixel electrode portion and the floating strip electrodes, and allow the liquid crystal layer to scatter light during a voltage being applied, and wherein the first orientation direction is:

a second direction in which each of the pixel strip electrodes extends, when the liquid crystal molecules have negative dielectric anisotropy;

the first direction that is perpendicular to the second direction, when the liquid crystal molecules have positive dielectric anisotropy;

wherein the pixel strip electrodes, which are arranged in the first direction, and the floating strip electrodes, which are arranged in the first direction on a lower side of the second substrate, do not overlap each other in a third direction perpendicular to the first substrate, wherein a distance between the pixel strip electrodes adjacent to each other in the first direction is substantially equal to a width of each of floating strip electrodes in the first direction, and wherein a distance between the floating strip electrodes adjacent to each other in the first direction is substantially equal to a width of each of pixel strip electrodes in the first direction.

2. The liquid crystal display device according to claim 1, wherein the pixel strip electrodes of the pixel electrode portion and the floating strip electrodes face each other with the liquid crystal layer therebetween.

3. The liquid crystal display device according to claim 1, wherein the floating strip electrodes are provided between the second substrate and the liquid crystals.

4. The liquid crystal display device according to claim 1, wherein a width in the first direction of each of the pixel strip electrodes of the pixel electrode portion and a spacing in the first direction between the pixel strip electrodes of the pixel electrode portion are 18 µm or smaller.

5. The liquid crystal display device according to claim 1, wherein the pixel electrode portion that includes the pixel strip electrodes each of which extends in the second direction and which are arranged in the first direction that is:

a direction perpendicular to the first orientation direction, when the liquid crystal molecules have negative dielectric anisotropy; and the first orientation direction that is perpendicular to the second direction, when the liquid crystal molecules have positive dielectric anisotropy.

6. The liquid crystal display device according to claim 1, wherein the transverse electric field is generated between the pixel strip electrodes and the common electrode overlapping an entire area in which the pixel strip electrodes are disposed, in the first direction during a voltage being applied, such that a dark domain and a bright domain of a liquid crystal texture are alternately arranged along the second direction to allow boundaries of refractive indices between the dark domain and the bright domain to appear between the pixel strip electrodes and allow the liquid crystal layer to scatter light.

7. The liquid crystal display device according to claim 1, wherein, in the third direction, the common electrode overlaps both of the pixel strip electrodes and the floating strip electrodes that do not overlap each other.

8. A liquid crystal display device comprising:

a first substrate including a common electrode and a pixel electrode facing the common electrode;

a second substrate facing the first substrate and including a floating electrode;

a liquid crystal layer including liquid crystal molecules held between the first substrate and the second substrate, the liquid crystal molecules being oriented in a first orientation direction when a transverse electric field is not generated;

wherein the pixel electrode is located closer to the liquid crystal layer than the common electrode is, and has a plurality of open regions arranged in a first direction, wherein the liquid crystal layer is configured to exhibit transparency when no voltage is applied thereto and to exhibit a scattering property when a voltage is applied thereto, wherein the transverse electric field is generated between the common electrode and the pixel electrode in the first direction and between the pixel electrode and the floating electrode, and allows the liquid crystal layer to scatter light during a voltage being applied, and wherein the first orientation direction is:

a second direction in which each of the open regions extends, when the liquid crystal molecules have negative dielectric anisotropy;

the first direction that is perpendicular to the second direction, when the liquid crystal molecules have positive dielectric anisotropy;

wherein the pixel electrode includes a plurality of pixel strip electrodes divided by the open regions arranged in the first direction, the pixel strip electrodes being arranged in a first direction, the floating electrode including a plurality of floating strip electrodes each of which is extending in the second direction, the pixel strip electrodes, which are arranged in the first direction, and the floating strip electrodes, which are arranged in the first direction on a lower side of the second substrate, do not overlap each other in a third direction perpendicular to the first substrate, wherein a distance between the pixel strip electrodes adjacent to each other in the first direction is substantially equal to a width of each of floating strip electrodes in the first direction, wherein a distance between the floating strip electrodes adjacent to each other in the first direction is substantially equal to a width of each of pixel strip electrodes in the first direction.

9. The liquid crystal display device according to claim 8, wherein the transverse electric field is generated between the pixel strip electrodes and the common electrode overlapping an entire area in which the pixel strip electrodes are disposed, in the first direction during a voltage being applied, such that a dark domain and a bright domain of a liquid crystal texture are alternately arranged along the second direction to allow boundaries of refractive indices between the dark domain and the bright domain to appear between the pixel strip electrodes and allow the liquid crystal layer to scatter light.

10. The liquid crystal display device according to claim 8, wherein, in the third direction, the common electrode overlaps both of the pixel strip electrodes and the floating strip electrodes that do not overlap each other.

* * * * *